(12) United States Patent
Kanevsky et al.

(10) Patent No.: US 11,601,344 B1
(45) Date of Patent: Mar. 7, 2023

(54) CLOUD GATEWAY OUTAGE RISK DETECTOR

(71) Applicant: AT&T Intellectual Property I, L.P., Atlanta, GA (US)

(72) Inventors: Zosim Kanevsky, Wayne, NJ (US); Wen-Jui Li, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/564,732

(22) Filed: Dec. 29, 2021

(51) Int. Cl.
*H04L 43/0817* (2022.01)
*H04L 41/50* (2022.01)
*H04L 41/5009* (2022.01)
*H04L 41/0604* (2022.01)

(52) U.S. Cl.
CPC ...... *H04L 41/5012* (2013.01); *H04L 41/0604* (2013.01); *H04L 41/5032* (2013.01); *H04L 43/0817* (2013.01)

(58) Field of Classification Search
None
See application file for complete search history.

(56) References Cited

U.S. PATENT DOCUMENTS

| | | | |
|---|---|---|---|
| 10,447,807 B1* | 10/2019 | Earl | G06F 11/076 |
| 2018/0048527 A1* | 2/2018 | Ganjam | H04L 65/80 |
| 2019/0163546 A1* | 5/2019 | Ungar | G06F 11/3476 |
| 2020/0358683 A1* | 11/2020 | Huang | H04L 43/04 |
| 2021/0168042 A1* | 6/2021 | Mijumbi | H04L 41/145 |
| 2022/0166682 A1* | 5/2022 | Patrick | H04L 41/147 |

* cited by examiner

*Primary Examiner* — Joshua Joo
(74) *Attorney, Agent, or Firm* — Hartman & Citrin LLC

(57) ABSTRACT

A cloud gateway outage risk detector can receive, by an event listener module, user session data associated with a plurality of user sessions over a cloud gateway. The event listener module can store the data in a database. A run-time collection module can obtain at least a portion of the data. The run-time collection module can provide the portion of the data to a run-time risk criteria evaluation module that can determine, based upon the portion of the data, a run-time outage risk criteria for the cloud gateway. A baseline risk criteria evaluation module can obtain historical data from the database. The baseline risk criteria evaluation module can determine, based upon the data, a baseline outage risk criteria for the cloud gateway. The run-time risk criteria evaluation module can determine whether the run-time outage risk criteria meets or exceeds an outage risk threshold.

14 Claims, 16 Drawing Sheets

CLOUD GATEWAY OUTAGE RISK DETECTOR

BACKGROUND

Network functions virtualization ("NFV") is a technology initiative that aims to move traditional and evolving mobility networking functions, such as access network elements, core network elements, transport network elements, and others, from purpose-built hardware to commercial-off-the-shelf ("COTS") server-based platforms. This is achieved through virtualization of mobility networking functions to create virtual networking functions ("VNFs") that operate on COTS hardware.

Software-defined network ("SDN") is an architectural framework that provides a software-centric cloud environment for creating intelligent networks that are programmable, application aware, and more open than traditional hardware-based network architectures. SDN provides an agile and cost-effective communications platform for handling the dramatic increase in data traffic on carrier networks by providing a high degree of scalability, security, and flexibility. SDN provides several benefits over traditional networks. SDN allows for the creation of multiple virtual network control planes on common hardware. SDN helps extend service virtualization and software control into many existing network elements. SDN enables applications to request and manipulate services provided by the network and to allow the network to expose network states back to the applications. SDN exposes network capabilities through application programming interfaces ("APIs"), making the control of network equipment remotely accessible and modifiable via third-party software clients using open protocols such as OpenFlow, available from Open Network Forum ("ONF").

Combining SDN and NFV functionality, such as in Domain 2.0, available from AT&T, provides a highly complex and dynamic set of relationships between virtual, logical, and physical resources. Networks, such as embodied in Domain 2.0 deployments, provide intelligent software systems and applications operating on general purpose commodity hardware (e.g., COTS). This not only drives down capital expenditures, ongoing operational costs, and helps to configure networks with less human intervention, but also creates significant opportunities to scale and monetize existing and new intelligent services.

Within service providers, such as AT&T, orchestration systems like Enhanced Control, Orchestration, Management, and Policy ("ECOMP") have been created to dramatically reduce monotonous tasks and monitoring required by human operators through data-based analytics. Current orchestration systems often incite frustration among operators due to over-complicated network status readouts, non-specific network manipulations automatically performed by the orchestration system, and the inability to quickly "revert" changes caused by such manipulations. AT&T's ECOMP has been combined with the Open Orchestrator Project ("OPEN-O") to create the Open Network Automation Platform ("ONAP") project supported by the Linux Foundation. ONAP is an open source software platform that delivers capabilities for the design, creation, orchestration, monitoring, and life cycle management of SDNs and the VNFs operating therein, as well as higher-level services that utilize the functionality of SDN/VNF. ONAP provides automatic, policy-driven interaction of these functions and services in a dynamic, real-time cloud environment. ONAP also provides graphical design tools for function/service creation.

In recent years, SDN technology has been implemented for wide area networks ("WANs") to bring network virtualization to the network edge. Historically, businesses have relied on site-to-site multiprotocol label switching ("MPLS") virtual private network ("VPN") to connect corporate and branch locations. MPLS VPN links provide the highest service level guarantees for network availability, packet loss, congestion, jitter, and latency. Although MPLS VPN links provide excellent performance and reliability, MPLS VPN links may not be cost-effective for some implementations. IP VPNs provide a less expensive alternative and can use tunneling protocols such as IPsec to emulate a private network on public infrastructure. IP VPNs do not deliver the performance and security of MPLS VPNs, and therefore are not recommended to be used for traffic associated with business critical applications. SD-WANs enable the ability to dynamically route traffic over multiple WAN connections based upon pre-defined policies and WAN link performance monitoring. In doing so, SD-WANs combine the reliability offered by MPLS links with the cost-effectiveness of dual, single, or mobile broadband links to create hybrid networks that can deliver reduced costs, increased network agility, optimized cloud connectivity, and enhanced application and performance visibility.

SD-WAN service can utilize universal customer premises equipment ("uCPE") installed at each edge location. The uCPEs can reside on COTS hardware and can host one or more VNFs, each of which can provide functionality such as firewalls, routers, WAN optimization, traffic controllers, and the like. A centralized cloud-based orchestrator can remotely configure the uCPEs using business rules based upon which the uCPEs can determine whether traffic should be sent over an inexpensive Internet connection (e.g., for non-critical traffic) or over a secure MPLS VPN (e.g., for critical and/or sensitive traffic). These connections can terminate in virtual SD-WAN gateways operating in cloud environments, such as, for example, MICROSOFT AZURE, AMAZON WEB SERVICES ("AWS"), AT&T Integrated Cloud ("AIC"), other public clouds, or other private clouds, thereby allowing SD-WAN traffic to be sent over a secure, high performance backbone before reaching its destination. Deployment of SD-WAN can be implemented on a per-site basis so that customers can migrate existing network infrastructure to SD-WAN in phases to accommodate MPLS-only, IPsec-only, SD-WAN only, and hybridization of multiple technologies coexisting on the same network.

An increasing number of enterprise information technology infrastructures include both on-premises and in-cloud application components. Enterprise networks utilize connectivity between these components using different implementations of secure tunnels layer over secured or non-secured network connections. The cloud side of these connections are often terminated on virtualized network gateways. Data traffic originated by multiple enterprise users and/or external customers travels over these connections, so proper gateway function is critical for operability of the entire infrastructure.

Currently, network gateways are monitored by enterprise fault management systems or by tools provided by cloud providers such as MICROSOFT, AMAZON, or GOOGLE. This monitoring creates fault alarms in response to pre-defined fault events and/or pre-defined thresholds. In many gateway outage incidents, however, the gateway failure develops gradually such that by the time a fault system issues an alarm, many enterprise users and/or external customers have already experienced an outage of their connection(s).

SUMMARY

Concepts and technologies disclosed herein are directed to a cloud gateway outage risk detector. According to one aspect disclosed herein, the cloud gateway risk detector can include a processor and a memory. The memory can store instructions for a plurality of modules that, when executed by the processor, cause the processor to perform operations. In particular, the cloud gateway outage risk detector can receive, by an event listener module of a risk evaluator module, user session data associated with a plurality of user sessions over a cloud gateway. The cloud gateway outage risk detector can store, by the event listener module, the user session data in a time series database. The cloud gateway outage risk detector can obtain, by a run-time collection module of the risk evaluator module, at least a portion of the user session data from the time series database. The portion of the user session data can be in equal time intervals. The cloud gateway outage risk detector can provide, by the run-time collection module, the portion of the user session data to a run-time risk criteria evaluation module of the risk evaluator module. The cloud gateway outage risk detector can obtain, by a baseline risk criteria evaluation module of the risk evaluator module, historical user session data from the time series database. The cloud gateway outage risk detector can determine, by the baseline risk criteria evaluation module, based upon the historical user session data, a baseline outage risk criteria for the cloud gateway. The cloud gateway outage risk detector can determine, by the run-time risk criteria evaluation module, based upon the portion of the user session data, a run-time outage risk criteria for the cloud gateway. The cloud gateway outage risk detector can determine, by the run-time risk criteria evaluation module, whether the run-time outage risk criteria meets or exceeds an outage risk threshold. In response to determining that the run-time outage risk criteria meets or exceeds the outage risk threshold, the run-time risk criteria evaluation module can instruct a notification module to generate a high outage risk alert for the cloud gateway. The notification module can generate the high outage risk alert and can send the high outage risk alert to an external entity to inform the external entity that the cloud gateway is at high risk of experiencing an outage. The external entity can be or can include a network operations center in some implementations.

The cloud gateway outage risk detector also can build an analytical model. In particular, the cloud gateway outage risk detector can receive, by a baseline risk criteria calculation module, a run-time risk criteria calculation module, and an outage risk threshold calculation module of an analytical model module, input including a model structure and at least one key model parameter. The cloud gateway outage risk detector can determine, by the baseline risk criteria calculation module, based at least in part upon the model structure and the key model parameter(s), a baseline risk criteria calculation algorithm to be used to determine the baseline outage risk criteria. The cloud gateway outage risk detector can determine, by the run-time risk criteria calculation module, based at least in part upon the model structure and the key model parameter(s), a run-time risk criteria calculation algorithm to be used to determine the run-time outage risk criteria. The cloud gateway outage risk detector can determine, by the outage risk threshold calculation module, an outage risk threshold calculation algorithm to be used to determine the outage risk threshold.

The cloud gateway outage risk detector can provide, by the baseline risk criteria calculation module, the baseline risk criteria calculation algorithm to the baseline risk criteria evaluation module of the risk evaluator module so that the baseline risk criteria evaluation module can determine the baseline outage risk criteria. The cloud gateway outage risk detector can provide, by the run-time risk criteria calculation module, the run-time risk criteria calculation algorithm to the run-time risk criteria evaluation module of the risk evaluator module so that the run-time risk criteria evaluation module can determine the run-time outage risk criteria. The cloud gateway outage risk detector can provide, by the outage risk threshold calculation module, the outage risk threshold calculation algorithm to the run-time risk criteria evaluation module of the risk evaluator module so that the run-time risk criteria evaluation module can determine the outage risk threshold.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

The concepts and technologies disclosed herein provide a cloud gateway outage risk detector that monitors telemetry data associated with the performance of one or more cloud gateways to warn network operations of a fault earlier than with existing fault management systems. The cloud gateway outage risk detector enables customers to maintain their connections while network operations have more time to address the fault before a cloud gateway goes down completely.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
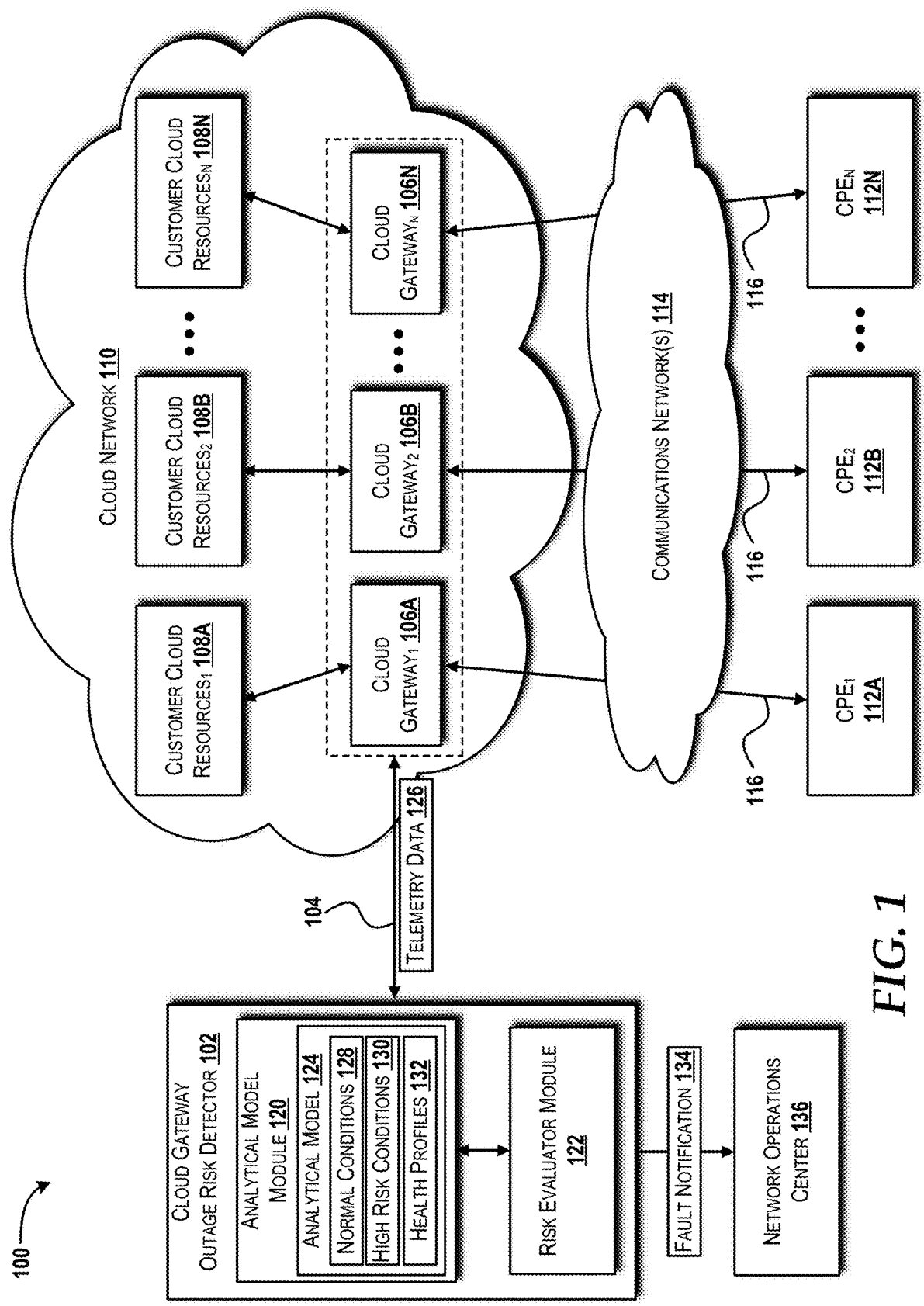
FIG. 1 is a block diagram illustrating aspects of an illustrative operating environment for various concepts and technologies disclosed herein.

Turning now to FIG. 1, an operating environment 100 in which embodiments of the concepts and technologies disclosed herein can be implemented will be described. The operating environment 100 includes a cloud gateway outage risk detector 102 that can monitor, via one or more telemetry data streams 104 (hereafter referred to individually as "telemetry data stream 104" or collectively as "telemetry data streams 104"), the operation of one or more cloud gateways 106A-106N (hereafter referred to individually as "cloud gateway 106" or collectively as "cloud gateways 106") that provide gateway functionality between sets of customer cloud resources 108A-108N (hereafter referred to individually as "customer cloud resources 108" or collectively as "customer cloud resources 108") of a cloud network 110 and customer premises equipment ("CPE") 112A-112N (hereafter referred to individually or collectively as "CPE 112") via one or more communications networks 114 (hereafter referred to individually as "communications network 114" or collectively as "communications networks 114"). In the illustrated example, the cloud gateway outage risk detector 102 monitors a first cloud gateway 106A (shown as "cloud gateway$_1$ 106A") that provides gateway functionality between a first set of customer cloud resources 108A (shown as "customer cloud resources' 108A") of the cloud network 110 and a first CPE 112A (shown as "CPE$_1$ 112A") via the communications network(s) 114. Likewise, the cloud gateway outage risk detector 102 monitors a second cloud gateway 106B (shown as "cloud gateway$_2$ 106B") that provides gateway functionality between a second set of customer cloud resources 108B (shown as "customer cloud resources$_2$ 108B") of the cloud network 110 and a second CPE 112B (shown as "CPE$_2$ 112B") via the communications network(s) 114. The cloud gateway outage risk detector 102 also monitors an $n^{th}$ cloud gateway 106N (shown as "cloud gateway$_N$ 106N") that provides gateway functionality between an $n^{th}$ set of customer cloud resources 108N (shown as "customer cloud resources$_N$ 108N") of the cloud network 110 and an $n^{th}$ CPE 112N (shown as "CPE$_n$ 112N") via the communications network(s) 114. Alternatively, one cloud gateway 106 can serve multiple sets of customer cloud resources 108 and multiple CPEs 112. Each of the CPEs 112 can represent multiple CPE units, such as uCPE, routers, and the like, which can be simultaneously supported by a single gateway 106. Each CPE unit, in turn, can support multiple user sessions. Accordingly, the illustrated example should not be construed as being limiting in any way.

The cloud network 110 can be a private cloud network, a public cloud network, a hybrid cloud network, or a multi-cloud network. Although one cloud network 110 is illustrated, the concepts and technologies disclosed herein can be applied to multiple cloud networks 110 monitored via one or more cloud gateway outage risk detectors 102. As used herein, a "private cloud network" is a cloud network that is provisioned for use by a select one or more customers. As used herein, a "public cloud network" is a cloud network that is provisioned for public use (i.e., anyone who wants to use or purchase access). As used herein, a "hybrid cloud network" can include at least two private clouds, at least two public clouds, or at least one private cloud and at least one public cloud. As used herein, a "multi-cloud network" includes any combination of public and/or private clouds from more than one cloud service provider. The cloud network 110 can provide one or more cloud services such as Infrastructure-as-a-Service ("IaaS"), Platform-as-a-Service ("PaaS"), and/or Software-as-a-Service ("SaaS") via the cloud resources 108. The cloud resources 108 can be executed on top of host hardware such as compute resources, memory resources, and other hardware resources. Additional details in this regard will be described herein with reference to an example cloud computing platform 1400 shown in FIG. 14.

An increasing number of enterprise IT infrastructures include both on-premises (e.g., as part of the CPEs 112) and in-cloud application components (e.g., as part of the cloud resources 108). Enterprise networks utilize connectivity between these components using different implementations of secure tunnels 116 (e.g., IPsec tunnels and SD-WAN tunnels) layered over secured or non-secure network connections provided by the communications network(s) 114. The communications network(s) 114 can encompass any number and combination of public and/or private networks, including, for example, public Internet, dedicated Internet, MPLS-based networks, VPN, MPLS-based VPN, IPsec-based VPN, WAN, LAN, or any combination thereof. The communications network(s) 114 can include wireline access via wireline technologies such as optical fiber, cable, and ethernet and/or wireless access via wireless technologies such as Long-Term Evolution ("LTE"), 5G technologies (e.g., low-band, mid-band, and high-band millimeter wave). The communications network(s) 114 can include an underlay network such as an MPLS-based underlay network over which an overlay network such as an SD-WAN overlay network provides the secure tunnels 116. Those skilled in the art will appreciate the numerous configurations of the communications network(s) 114 to enable connectivity between the CPEs 112 and the cloud gateways 106 via the secure tunnels 116.

The CPEs 112 can be or can include traditional CPEs that are hardware-based (i.e., physical network functions "PNFs") that reside at a customer site. Some examples include function specific hardware such as routers, firewalls, and switches. The CPEs 112 can be or can include virtual CPEs ("vCPEs") that are hosted on hardware on-premises at a customer site (e.g., a data center) or on hardware in the cloud network 110 and accessible via an on-premises component such as a layer 2 switch. The CPEs 112 can be or can include universal CPEs ("uCPEs") that include virtual network functions ("VNFs") that are hosted on virtualized hardware on-premises at a customer site.

In the illustrated example, the cloud gateway outage risk detector 102 is shown as operating outside of the cloud network 110. Alternatively, the cloud gateway outage risk detector 102 can operate inside the cloud network 110. The cloud gateway outage risk detector 102 can be implemented as part of the cloud gateways 106 or separately as shown. Although one cloud gateway outage risk detector 102 is shown, the cloud gateway outage risk detector 102 functionality can be implemented across multiple cloud gateway outage risk detectors 102. In such implementations, the cloud gateway outage risk detectors 102 can be standalone systems or part of a larger system that may be controlled by a separate controller (not shown). The cloud gateway outage risk detector may operate on COTS or dedicated hardware.

The illustrated cloud gateway outage risk detector 102 includes an analytical model module 120 and a risk evaluator module 122. These modules can be software modules executed, for example, by one or more computing systems, including traditional and/or virtualized computing systems operating as or part of the cloud gateway outage risk detector 102. These modules can be hardware modules or combinations of hardware and software that perform the operations described herein.

The analytical model module 120 includes an analytical model 124. As used herein, a "model" includes data attributes of objects, the relationships among the objects, and the associated management methodologies (e.g., processes, analytics, and policies). The analytical model 124 can be trained by a machine learning system such as the example machine learning system 1500 that is illustrated and described herein with reference to FIG. 15. The analytical model module 120 can implement the analytical model 124 to perform operations described herein. In particular, the analytical model 124 can use start and end times of user sessions obtained from the telemetry data 126 to learn what conditions constitute normal gateway functions (shown in FIG. 1 as "normal conditions 128) and what conditions constitute high outage risk conditions (shown in FIG. 1 as "high risk conditions 130"). Based upon the normal conditions 128 and the high risk conditions 130, the analytical model 124 can build health profile(s) 132 (hereafter referred to individually as "health profile 132" or collectively as "health profiles 132") of the cloud gateway(s) 106 being monitored. The health profiles 132 can be learned and created for each monitored cloud gateway 106 and can account for the specific workload mix of each monitored cloud gateway 106. Additional details about the analytical model module 120 and the analytical model 124 will be described herein with reference to FIGS. 8B and 10.

The risk evaluator module 122 can apply the analytical model 124 to real-time user session data obtained as part of the telemetry data 126 to build the parameters of the normal conditions 128 and the high risk conditions 130. The risk evaluator module 122 also applies the analytical model 124 to detect whether the monitored cloud gateway 106 are at high risk of an outage—that is, whether the real-time user session data is indicative of one or more of the high risk conditions 130. A threshold for "high" outage risk can be defined as part of the high risk conditions 130. Likewise a range of normal risk conditions can be defined as part of the normal conditions 128. If the cloud gateway outage risk detector 102 detects a high outage risk for any monitored cloud gateway 106, the risk evaluator module 122 can generate and send a fault notification 134 to a network operations center 136. The risk evaluator module 122 is described in greater detail herein with reference to FIGS. 8A and 9.

Figure 2:
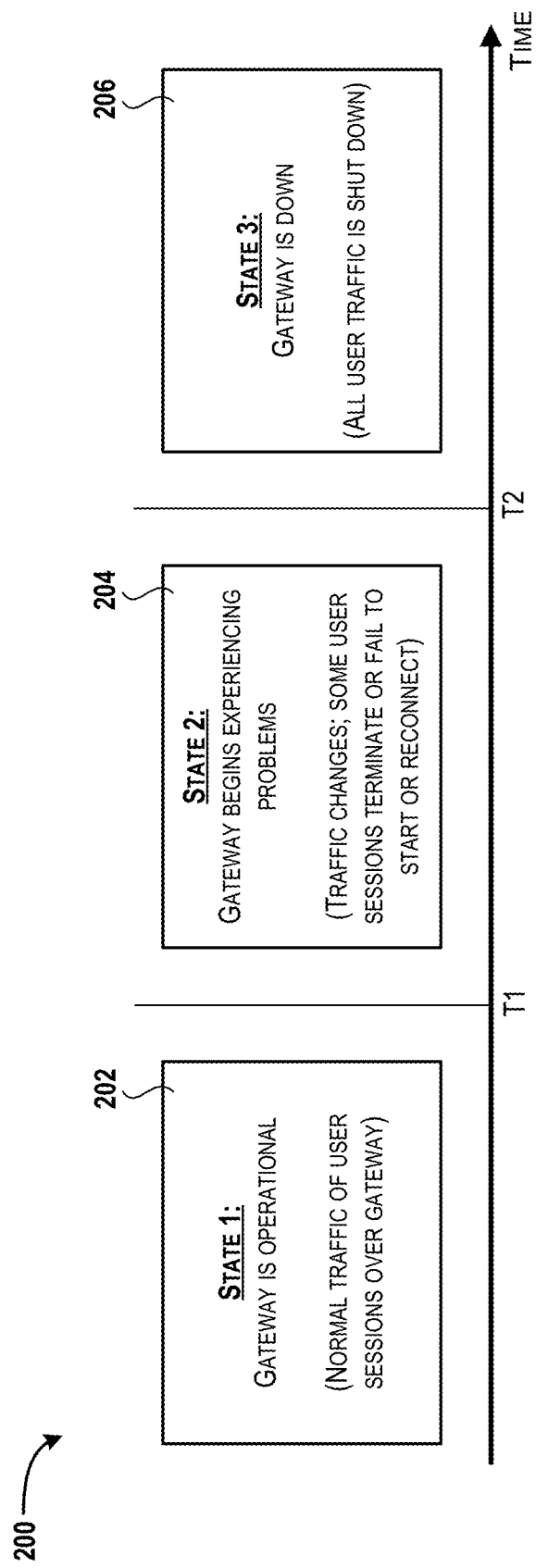
FIG. 2 is a diagram illustrating a typical timeline of a cloud gateway malfunction.

Turning now to FIG. 2, a typical timeline 200 of a cloud gateway malfunction will be described. A first state (shown as "state 1") 202 is representative of a gateway, such as one of the cloud gateways 106, that is fully operational. In the first state 202, normal traffic of user sessions traverses the cloud gateway 106. Between a first time T1 and a second time T2, the cloud gateway 102 enters a second state (shown as "state 2") 204 during which the user session patterns change and the cloud gateway 106 begins to experience problems. For example, user sessions may terminate earlier than normal for a given total number of user session for the cloud gateway; user sessions may try and fail to reconnect more often than normal; user sessions may attempt to start and fail more often than normal; and some user session may stay connected. In accordance with the concepts and technologies disclosed herein, the cloud gateway outage risk detector 102 can detect the user session pattern changes and notify (e.g., via the fault notification 134) the network operations center 136 prior to the second time T2 (e.g., 5-10 minutes after time T1). After the second time T2, the cloud gateway 102 enters a third state (shown as "state 3") 206 during which the cloud gateway 102 shuts down and all user sessions are disconnected, no new user session can be started, and an existing fault management system can issue an alarm for ticketing against the cloud gateway 102.

Figure 3:
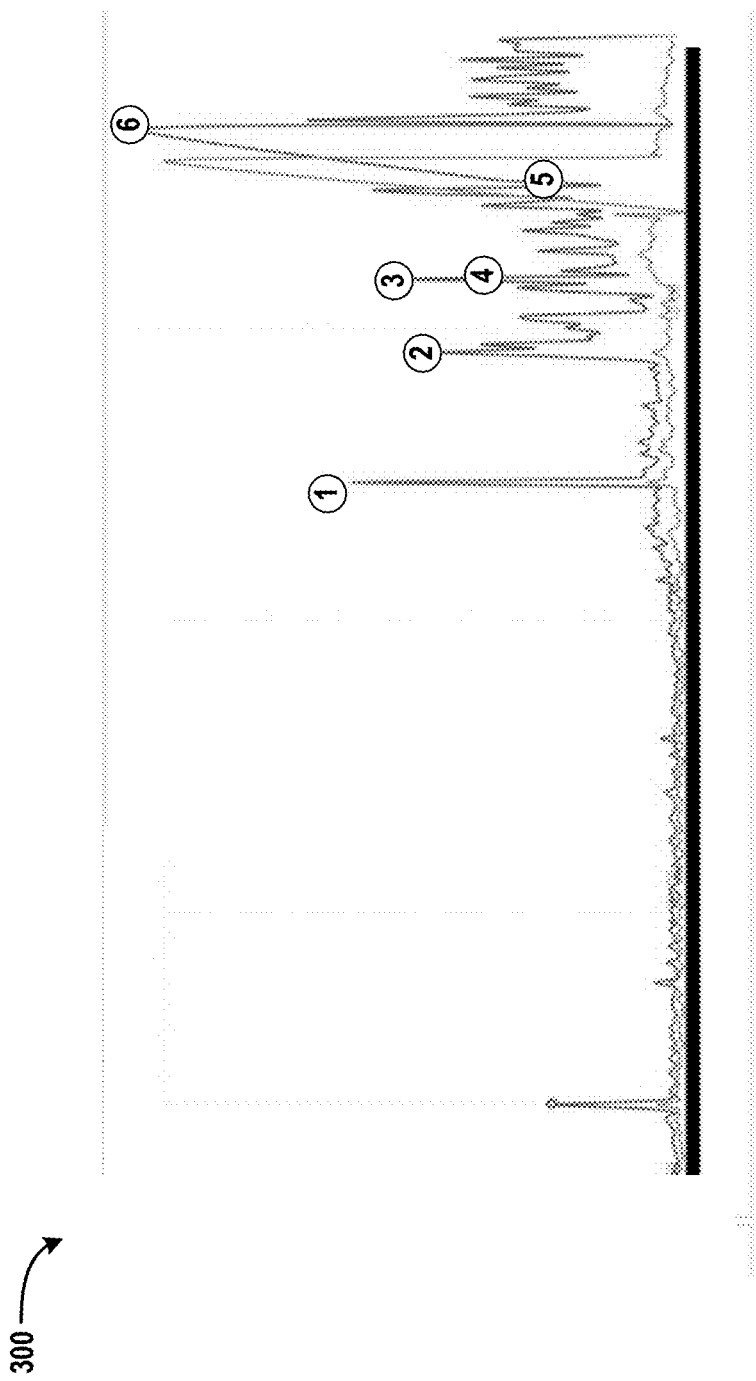
FIG. 3 is a graph illustrating an example outage timeline of events that can lead up to a cloud gateway outage.

Turning now to FIG. 3, a graph 300 shows an example outage timeline of events that lead up to a cloud gateway outage. The example outage timeline 300 includes markers labeled (1) through (6). Marker (1) corresponds to time T1 in the timeline 200 illustrated and described above with reference to FIG. 2. Prior to marker (1), normal traffic of user sessions traverse the cloud gateway 106. The interval between markers (1) and (5) roughly corresponds to the interval between time T1 and time T2 in the timeline 200 illustrated and described above with reference to FIG. 2. During this interval, traffic changes and some user sessions are terminated, fail to start, or fail to reconnect. Marker (5) corresponds to after time T2 in the timeline 200 when the cloud gateway has failed and user traffic is shut down.

Figure 4:
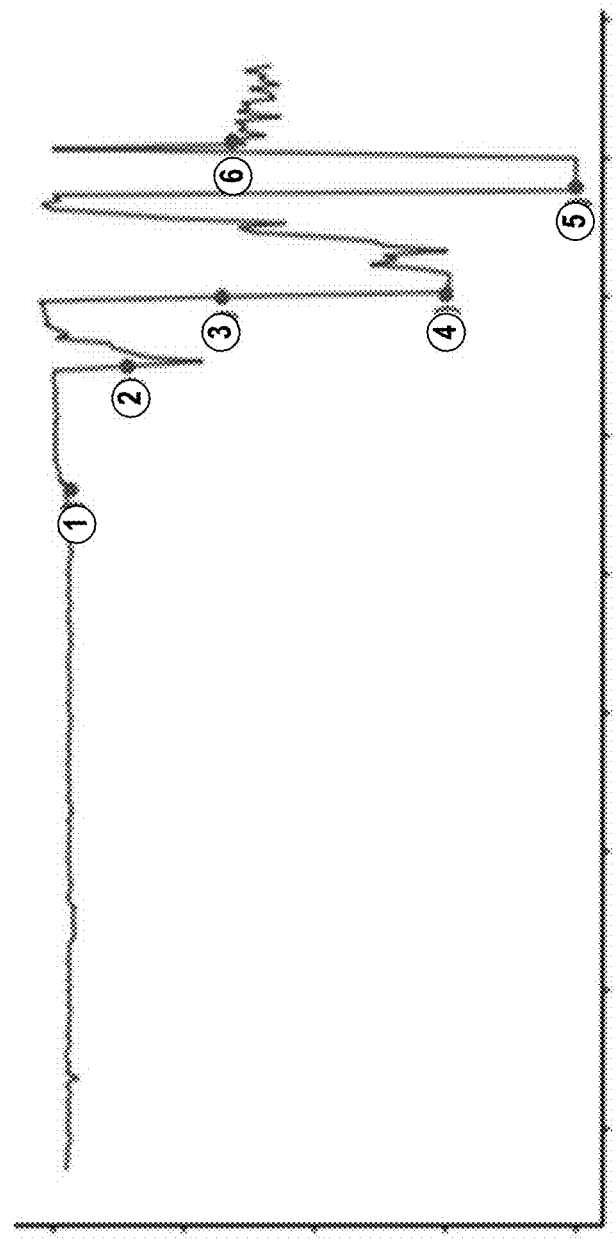
FIG. 4 is a graph illustrating open user sessions for a failing cloud gateway.

Turning now to FIG. 4, a graph 400 shows open user sessions for a failing cloud gateway 106. The graph 400 shows time on the X-axis and a count of open tunnels on the Y-axis. Markers (1) through (6) are shown and represent the same times as illustrated and described above with reference to FIG. 3. Specifically, the time interval between markers (1)

and (5) shows that the number of open user sessions is decreasing, and by marker (5), all user session are down and the cloud gateway 106 has failed.

Figure 5A:
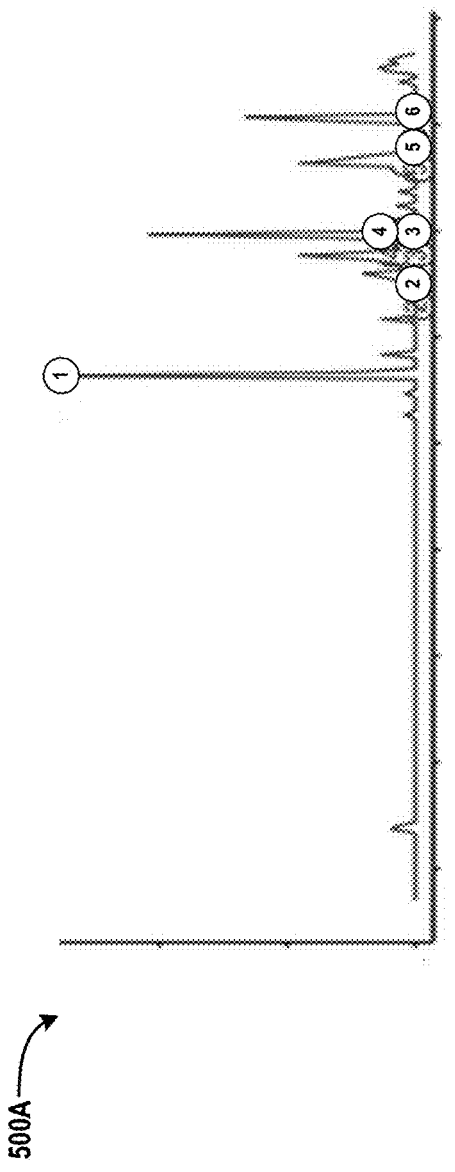
FIG. 5A is a graph illustrating counts of flapping user sessions (i.e., user session that last up to 20 seconds and then are closed) within a sliding time window.

Turning now to FIG. 5A, a graph 500A shows counts of flapping user sessions (i.e., user session that last up to 20 seconds and then are closed) within a sliding time window. The graph 500A shows date and time on the X-axis and a count of flapping user sessions per sliding time window on the Y-axis. Marker (1) indicates when the first such anomaly was observed. Markers (2)-(6) indicate subsequent anomalies.

Figure 5B:
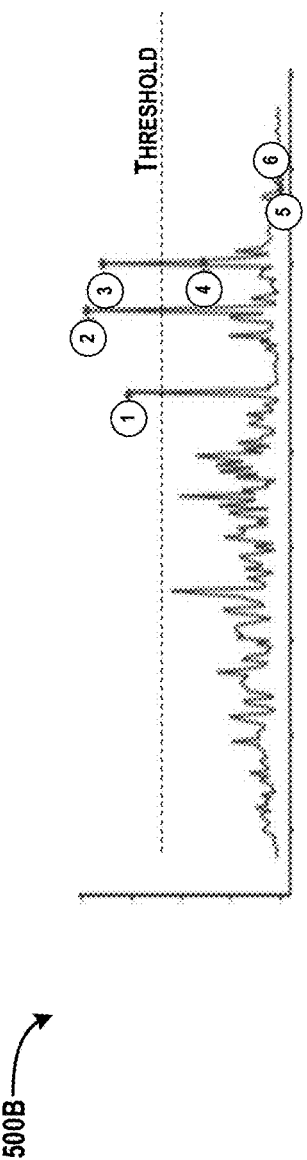
FIG. 5B is a graph illustrating a mean duration of closed user sessions using the same sliding time windows as in the graph shown in FIG. 5A.

Turning now to FIG. 5B, a graph 500B shows the mean duration of closed user sessions using the same sliding time windows as in the graph 500A illustrated and described above with reference to FIG. 5A. The graph 500B shows date and time on the X-axis and the mean duration of closed user sessions within the sliding time window on the Y-axis. Peaks at the markers (1)-(3) indicate an abnormally high number of closed long-lived sessions relative to a given threshold. Marker (1) indicates when the first anomaly was observed against the given threshold.

Figure 6:
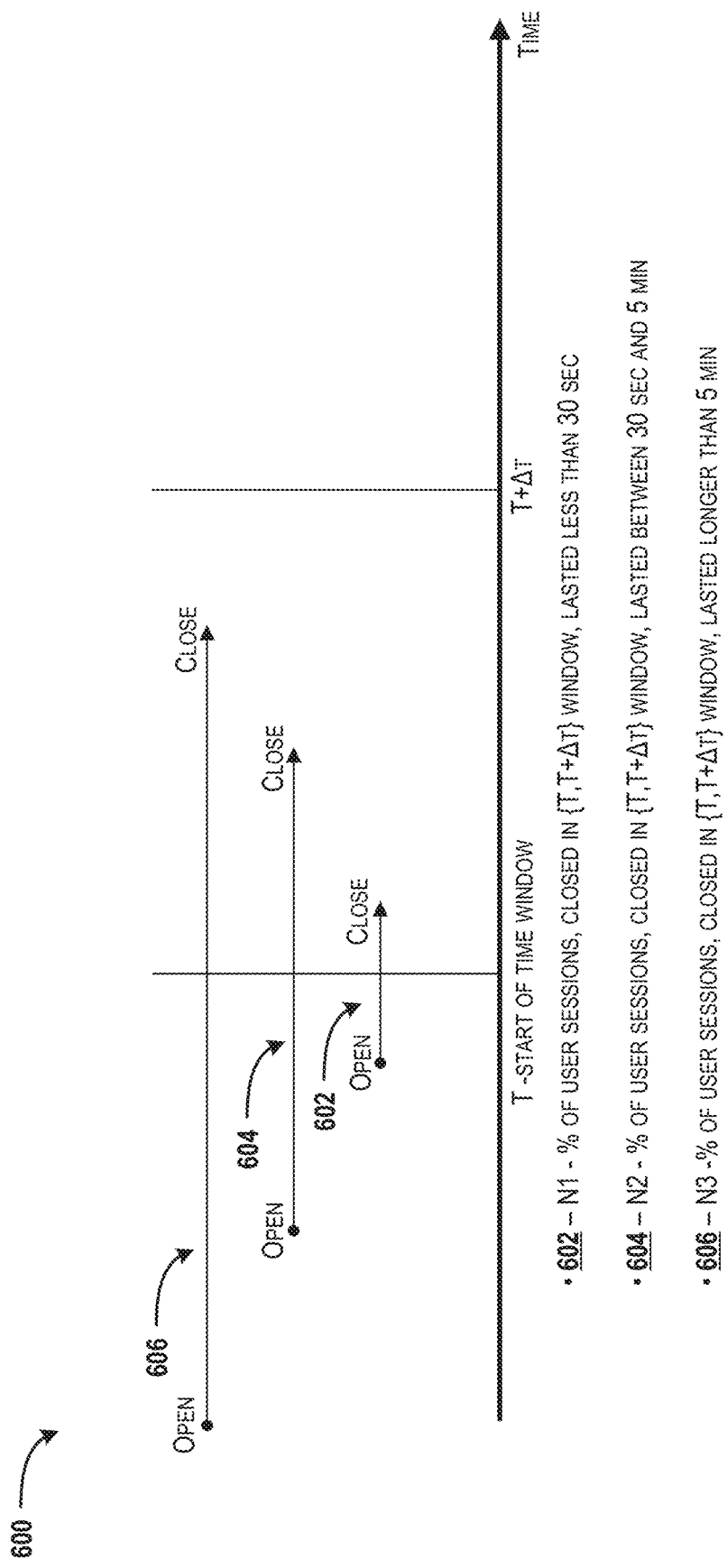
FIG. 6 is a graph illustrating example analytical model metrics.

Turning now to FIG. 6, a graph 600 illustrating example analytical model metrics will be described. In particular, the graph 600 depicts example user sessions from an open time (labeled "open") to a close time (labeled "close"). A first cluster of sessions represented generally at 602 shows user sessions closed in a $\{T,T+\Delta T\}$ window and lasted less than 30 seconds. A second cluster of user sessions represented generally at 604 shows user sessions closed in a $\{T,T+\Delta T\}$ window and lasted between 30 seconds and 5 minutes. A third cluster of user sessions represented generally at 606 shows user sessions closed in a $\{T,T+\Delta T\}$ window and lasted longer than 5 minutes.

Figures 7A, 7B:
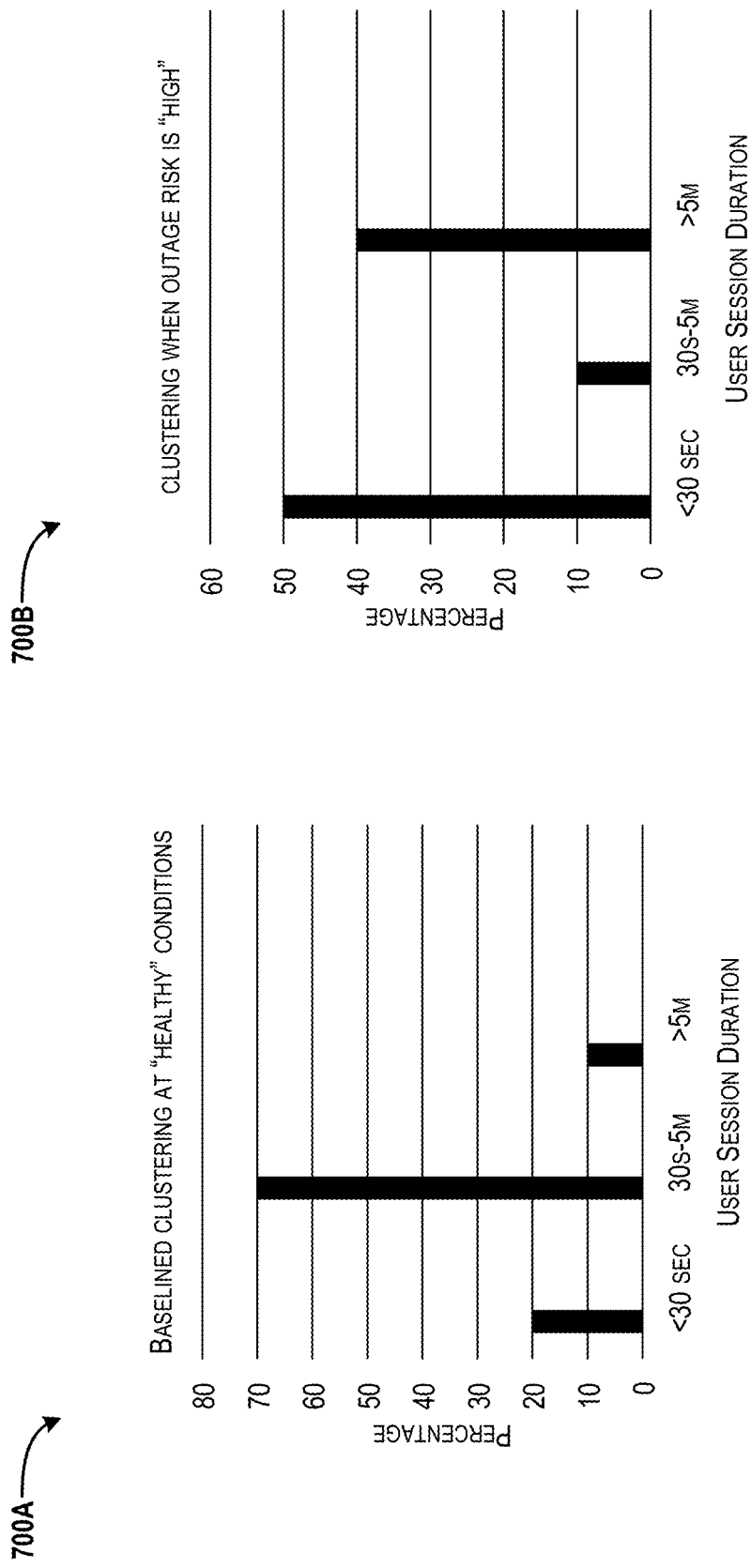
FIGS. 7A and 7B are bar charts illustrating example outage risk conditions.

Turning now to FIGS. 7A and 7B, bar charts 700A, 700B illustrated example outage risk conditions will be described. The bar charts 700A, 700B represent only one component of cloud gateway outage risk criteria—clustering the numbers of user sessions that closed in a $\{T,T+\Delta T\}$ window. In particular, the bar chart 700A represents baselined clustering at healthy conditions with the percentage on the Y-axis and the user session duration on the X-axis; and the bar chart 700B represents clustering when outage risk is "high" (i.e., above a pre-defined threshold).

Figure 8A:
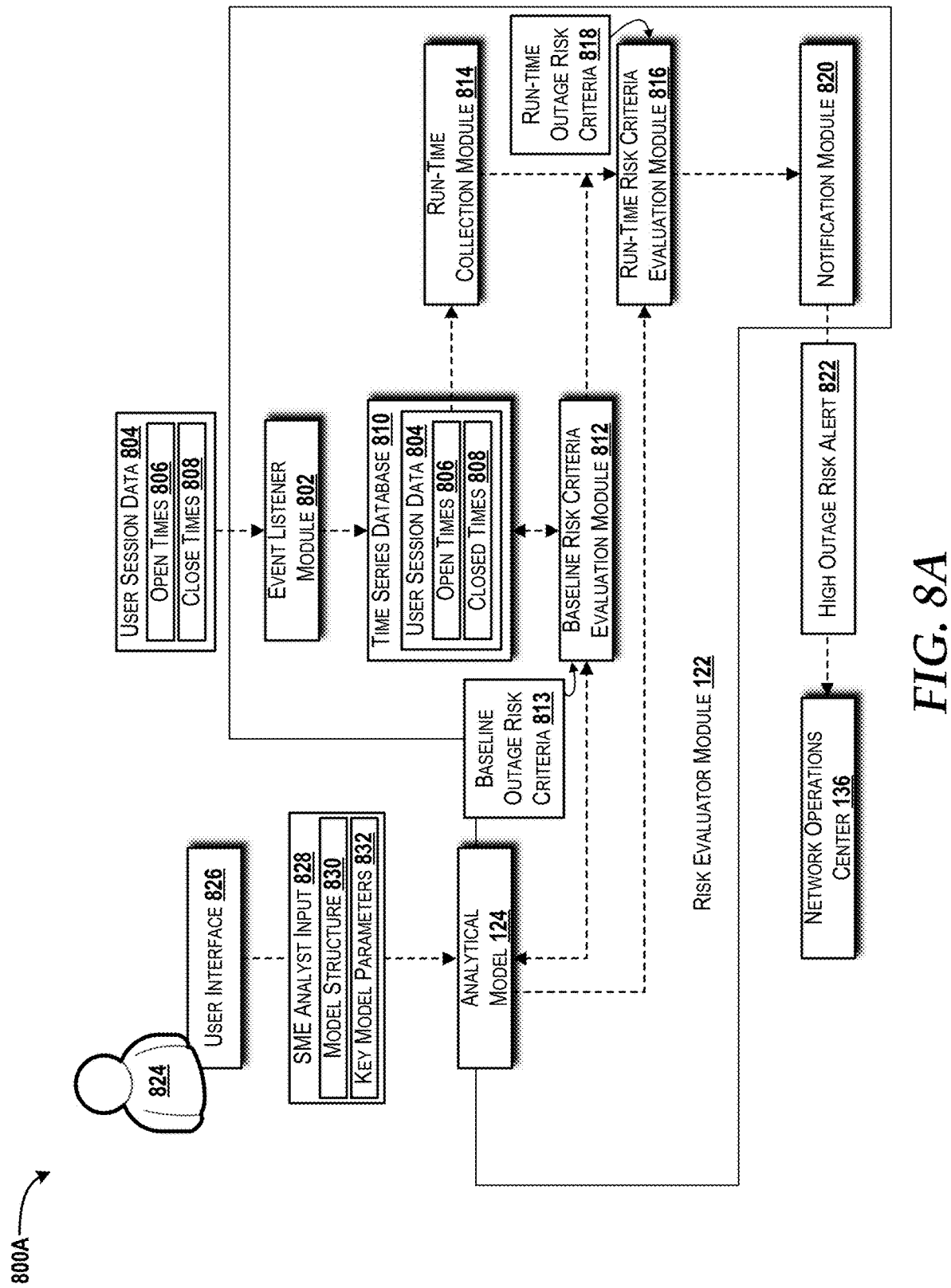
FIG. 8A is a diagram illustrating an operating environment in which a risk evaluator module of a cloud gateway outage risk detector can be implemented, according to an illustrative embodiment of the concepts and technologies disclosed herein.

Turning now to FIG. 8A, an operating environment 800A in which the risk evaluator module 122 of the cloud gateway outage risk detector 102 can be implemented will be described in greater detail, according to an illustrative embodiment. The illustrated risk evaluator module 122 includes an event listener module 802 that listens on the telemetry data streams 104 for the telemetry data 126, including user session data 804 and corresponding open times 806 and close times 808 for each user session. The event listener module 802 can provide the user session data 804 to a time series database 810 for storage. The time series database 810 can include all collected user session data 804 for a specified retention period. The time series database functions as a data source for baselining risk criteria and evaluating this risk criteria in real-time.

The illustrated risk evaluator module 122 also includes a baseline risk criteria evaluation module 812, a run-time collection module 814, and a run-time risk criteria evaluation module 816. The baseline risk criteria evaluation module 812 uses a time series historical data collection of the user session data 804 and the analytical model 124 to evaluate baseline outage risk criteria 813 (i.e., outage risk under normal conditions). The run-time collection module 814 obtains the user session data 804 from the time series database 810 in equal time intervals and passes the user session data 804 to the run-time risk criteria evaluation module 816. The run-time risk criteria evaluation module 816 uses the latest metrics provided by the run-time collection module 814 to evaluate run-time outage risk criteria 818 (i.e., outage risk under current conditions). The run-time collection module 814 can evaluate the current outage risk criteria 818 to determine whether the current outage risk criteria 818 is above a pre-defined threshold. If so, the run-time risk criteria evaluation module 816 can instruct a notification module 820 to generate and send a high outage risk alert 822 to the network operations center 136.

The operating environment 800A also shows a subject matter expert ("SME") 824 who can utilize a user interface 826 to provide SME analyst input 828. The SME analyst input 828 can include a model structure 830 for the analytical model 124 and any key model parameters 832 to be considered in building the analytical model 124.

Figure 8B:
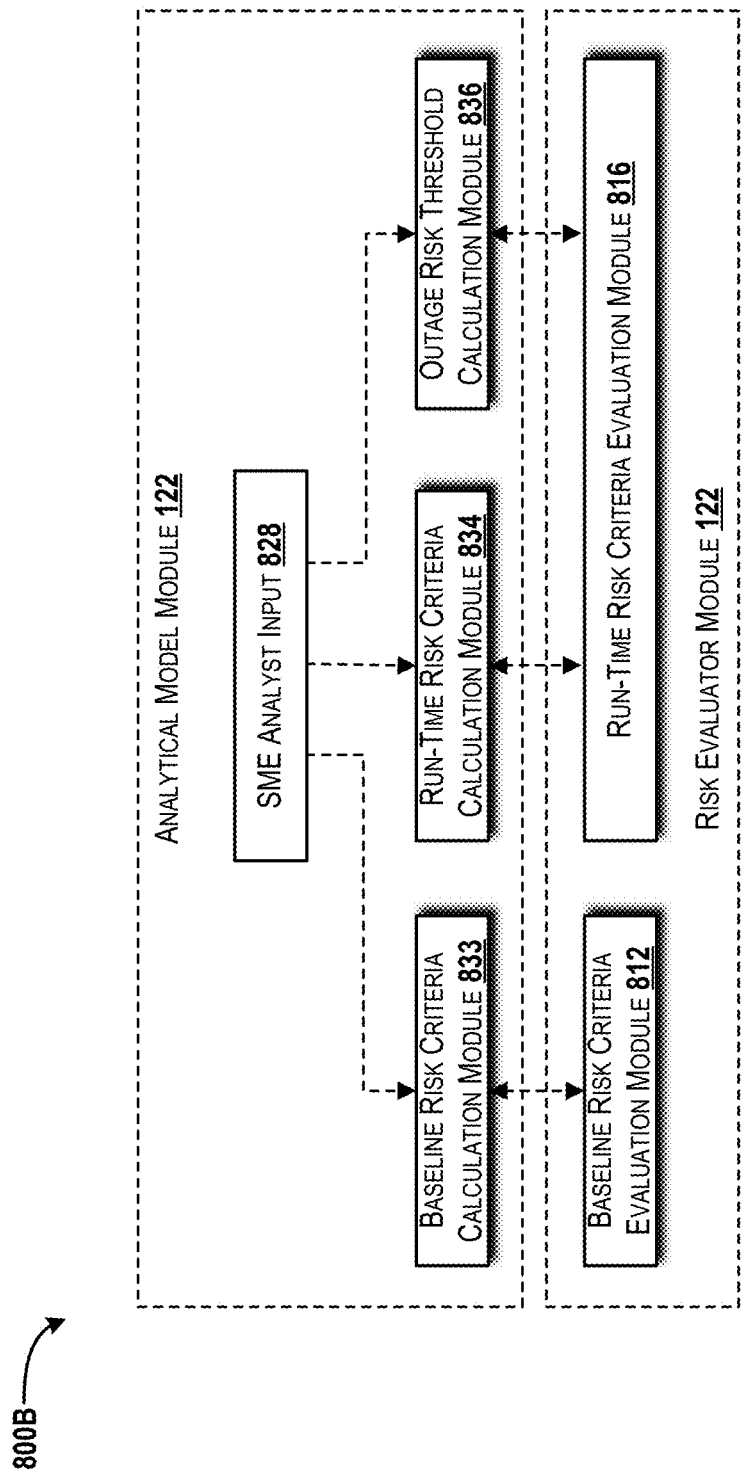
FIG. 8B is a diagram illustrating an operating environment in which an analytical model module of a cloud gateway outage risk detector can be implemented, according to an illustrative embodiment of the concepts and technologies disclosed herein.

Turning now to FIG. 8B, an operating environment 800B in which the analytical model module 120 of the cloud gateway outage risk detector 102 can be implemented will be described in greater detail, according to an illustrative embodiment. The illustrated analytical model module 120 includes a baseline risk criteria calculation module 833, a run-time risk criteria calculation module 834, and an outage risk threshold calculation module 836, each of which are capable of defining algorithms for use by the risk evaluator module 122 to perform various operations described herein.

The baseline risk criteria calculation module 833 can define an algorithm to be used by the baseline risk criteria evaluation module 812 of the risk evaluator module 122 to calculate the baseline outage risk criteria 813. The run-time risk criteria calculation module 834 can define an algorithm to be used by the run-time risk criteria evaluation module 816 to calculate the run-time outage risk criteria 818. The outage risk threshold calculation module 836 can define an algorithm to be used by the run-time risk criteria evaluation module 816 to determine whether the current run-time outage risk criteria 818 is above a pre-defined threshold.

Figure 9:
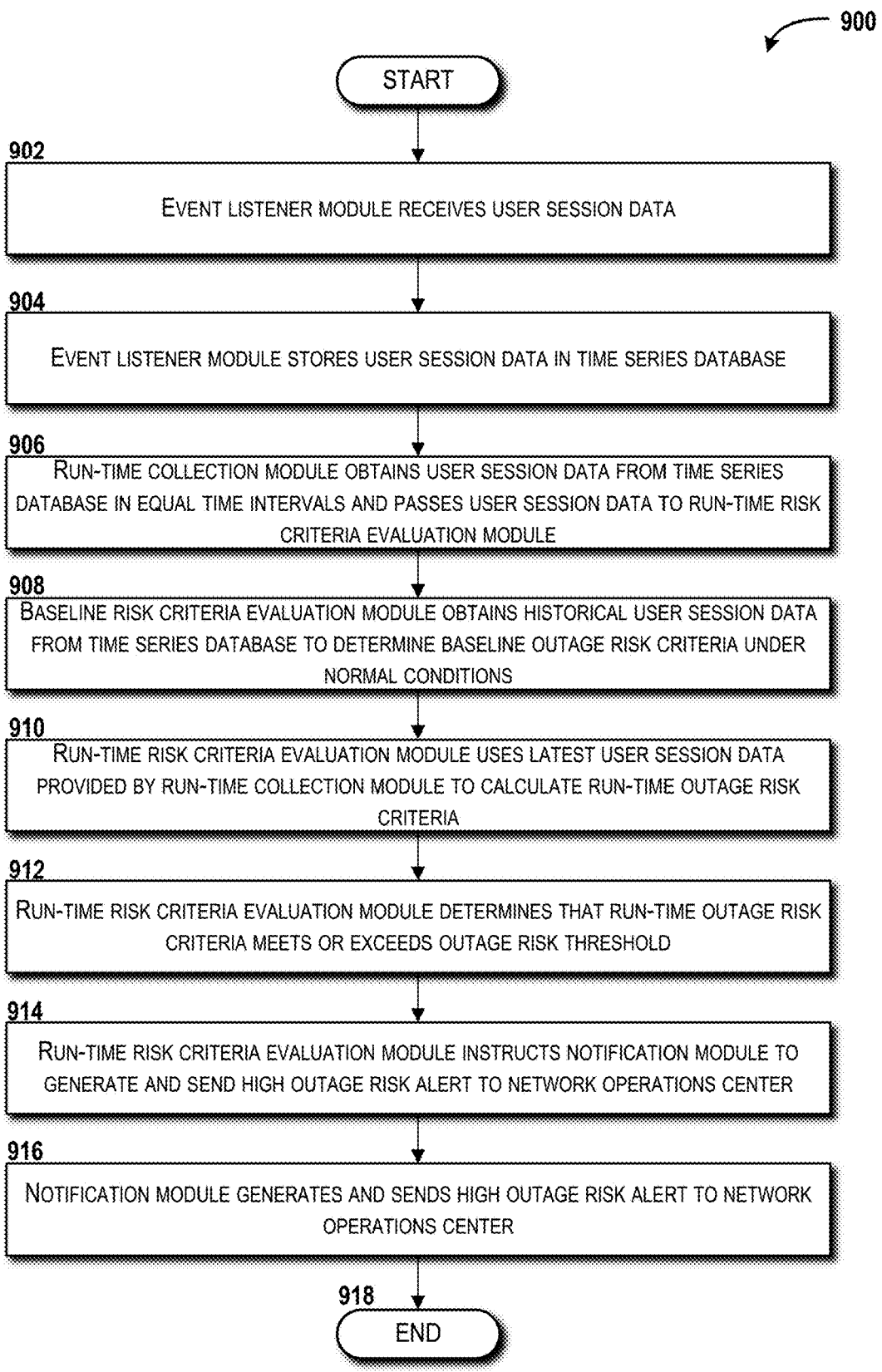
FIG. 9 is a flow diagram illustrating aspects of a method for evaluating cloud gateway outage risk, according to an illustrative embodiment of the concepts and technologies disclosed herein.

Turning now to FIG. 9, a flow diagram illustrating aspects of a method 900 for evaluating cloud gateway outage risk will be described, according to an illustrative embodiment of the concepts and technologies disclosed herein. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, or a portion thereof, to perform one or more operations, and/or causing the processor to direct other components of the computing system or device to perform one or more of the operations.

For purposes of illustrating and describing the concepts of the present disclosure, operations of the methods disclosed herein are described as being performed alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 900 will be described with additional reference to FIG. 8A. The method 900 begins and proceeds to operation 902. At operation 902, the event listener module 802 receives the user session data 804, including open times 806 and close times 808 for user sessions provided, at least in part, via the cloud gateway 106. From operation 902, the method 900 proceeds to operation 904. At operation 904, the event listener module 802 stores the user session data 804 in the time series database 810.

From operation 904, the method 900 proceeds to operation 906. At operation 906, the run-time collection module 814 obtains at least a portion of the user session data 804 from the time series database 810 in equal time intervals and passes the user session data 804 to the run-time risk criteria evaluation module 816. From operation 906, the method 900 proceeds to operation 908. At operation 908, the baseline risk criteria evaluation module 812 obtains historical user session data 804 from the time series database 810 to determine the baseline outage risk criteria 813 for the cloud gateway 106 operating under normal conditions 128.

From operation 908, the method 900 proceeds to operation 910. At operation 910, the run-time risk criteria evaluation module 816 uses the latest user session data 804 provided by the run-time collection module 814 to calculate the run-time outage risk criteria 818. From operation 910, the method 900 proceeds to operation 912. At operation 912, the run-time risk criteria evaluation module 816 determines whether the run-time outage risk criteria 818 meets or exceeds an outage risk threshold. In the illustrated example, it is assumed that the run-time outage risk criteria 818 meets or exceeds the outage risk threshold. If, however, the run-time outage risk criteria 818 does not meet or exceed the outage risk threshold, the method 900 can revert back to operation 910 and the method 900 can continue as described.

From operation 912, the method 900 proceeds to operation 914. At operation 914, the run-time risk criteria evaluation module 816 instructs the notification module 820 to generate and send a high outage risk alert 822 to the network operations center 136. The baseline risk criteria evaluation module 812 can be executed periodically or may be skipped as defined by a given implementation.

From operation 914, the method 900 proceeds to operation 916. At operation 916, the notification module 820 generates and sends the high outage risk alert to the network operations center 136. In some embodiments, the notification module 820 can utilize an existing fault management channel. In other embodiments, a new fault management channel can be established for faults determined via the cloud gateway outage risk detector 102.

From operation 916, the method 900 proceeds to operation 918. The method 900 can end at operation 918.

Figure 10:
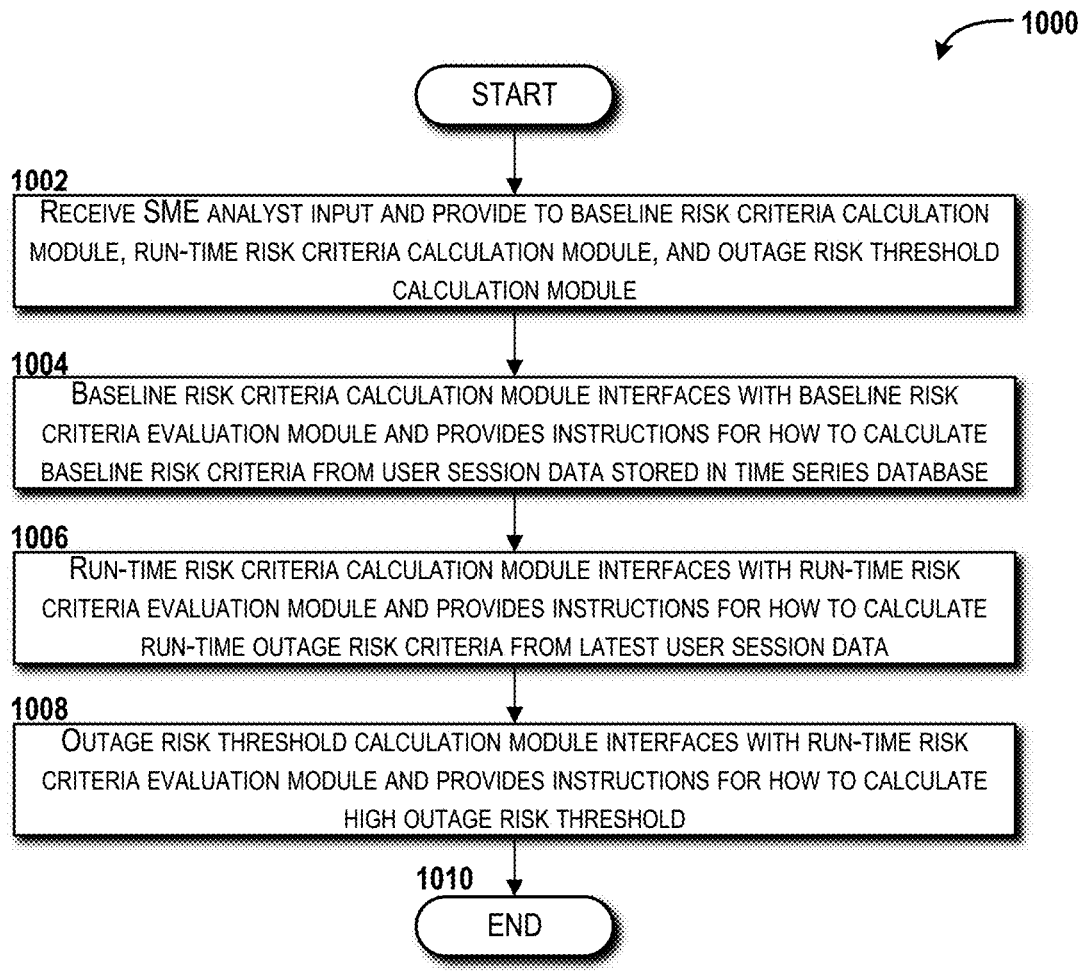
FIG. 10 is a flow diagram illustrating aspects of a method for building an analytical model, according to an illustrative embodiment of the concepts and technologies disclosed herein.

Turning now to FIG. 10, a flow diagram illustrating aspects of a method 1000 for building an analytical model 124 will be described, according to an illustrative embodiment of the concepts and technologies disclosed herein. The method 1000 will be described with additional reference to FIG. 8B. The method 1000 begins and proceeds to operation 1002. At operation 1002, the analytical model module 120 receives the SME analyst input 828, including the model structure 830 and any key model parameters 832 to be considered for the analytical model 124. Also at operation 1002, the analytical model module 120 can provide the SME analyst input 828 to the baseline risk criteria calculation module 833, the run-time risk criteria calculation module 834, and the outage risk threshold calculation module 836.

From operation 1002, the method 1000 proceeds to operation 1004. At operation 1004, the baseline risk criteria calculation module 833 interfaces with the baseline risk criteria evaluation module 812 and provides instructions (i.e., baseline risk criteria calculation algorithm) for how to calculate the baseline outage risk criteria 813 from the user session data 804 collected from the time series database 810.

From operation 1004, the method 1000 proceeds to operation 1006. At operation 1006, the run-time risk criteria calculation module 834 interfaces with the run-time risk criteria evaluation module 816 and provides instructions (i.e., run-time risk criteria calculation algorithm) for how to calculate the run-time outage risk criteria 818 from the latest user session data 804 collected from the time series database 810.

From operation 1006, the method 1000 proceeds to operation 1008. At operation 1008, the outage risk threshold calculation module 836 interfaces with the run-time risk criteria evaluation module 816 and provides instructions (i.e., outage risk threshold calculation algorithm) for how to calculate a high outage risk threshold.

From operation 1008, the method 1000 proceeds to operation 1010. The method 1000 can end at operation 1010. Although not shown in the illustrated example, the method 1000 can revert base to operation 1002 when new SME analyst input is provided. In this manner, the baseline risk criteria calculation module 833, the run-time risk criteria calculation module 834, and the outage risk threshold calculation module 836 can update the instructions provides to the risk evaluator module 122.

Figure 11:
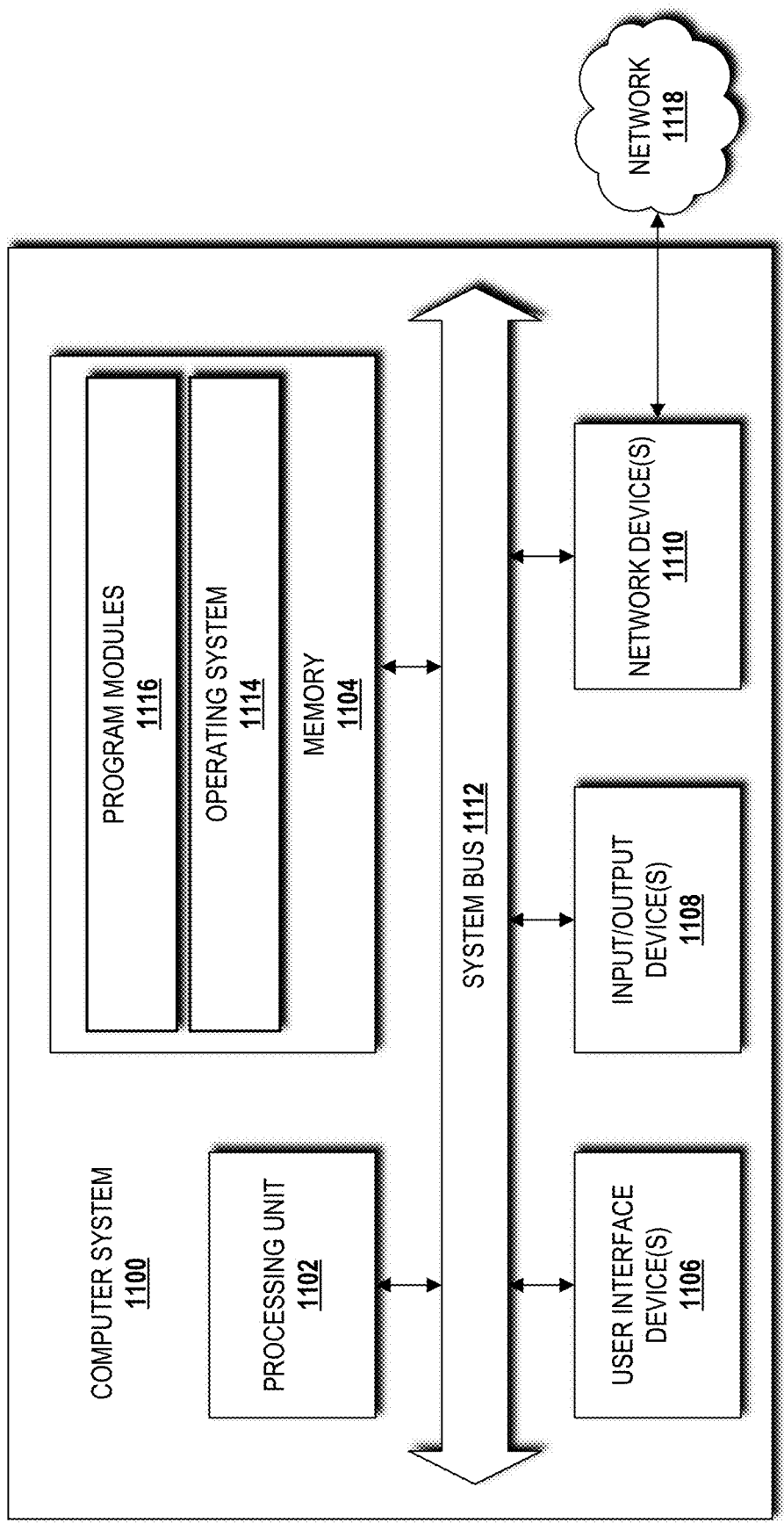
FIG. 11 is a block diagram illustrating a computer system configured to provide the functionality in accordance with various embodiments of the concepts and technologies disclosed herein.

Turning now to FIG. 11, a block diagram illustrating a computer system 1100 configured to provide the functionality in accordance with various embodiments of the concepts and technologies disclosed herein. The systems, devices, and other components disclosed herein, such as the cloud gateway outage risk detector 102, the cloud gateway(s) 106, the customer cloud resource(s) 108, the CPE(s) 112, components of the communications network(s) 114, components of the cloud network 110, components of the network operations center 136, or some combination thereof can be implemented, at least in part, using an architecture that is the same as or similar to the architecture of the computer system 1100. It should be understood, however, that modification to the architecture may be made to facilitate certain interactions among elements described herein.

The computer system 1100 includes a processing unit 1102, a memory 1104, one or more user interface devices 1106, one or more input/output ("I/O") devices 1108, and one or more network devices 1110, each of which is operatively connected to a system bus 1112. The bus 1112 enables bi-directional communication between the processing unit 1102, the memory 1104, the user interface devices 1106, the I/O devices 1108, and the network devices 1110.

The processing unit 1102 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 1104 communicates with the processing unit 1102 via the system bus 1112. In some embodiments, the memory 1104 is operatively connected to a memory controller (not shown) that enables communication with the processing unit 1102 via the system bus 1112. The illustrated memory 1104 includes an operating system 1114 and one or more program modules 1116. The operating system 1114 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 1116 may include various software and/or program modules to perform the various operations described herein. For example, the program modules 1116, in embodiments, can include the analytical model module 120 and corresponding sub-modules such as depicted in FIG. 8A and the risk evaluator module 122 and corresponding sub-modules such as depicted in FIG. 8B. The program modules 1116 and/or other programs can be embodied in computer-readable media containing instructions that, when executed by the processing unit 1102, perform various operations such as those described herein. According to embodiments, the program modules 1116 may be embodied in hardware, software, firmware, or any combination thereof.

By way of example, and not limitation, computer-readable media may include any available computer storage media or communication media that can be accessed by the computer system 1100. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1100. In the claims, the phrase "computer storage medium," "computer-readable storage medium," and variations thereof does not include waves or signals per se and/or communication media, and therefore should be construed as being directed to "non-transitory" media only.

The user interface devices 1106 may include one or more devices with which a user accesses the computer system 1100. The user interface devices 1106 may include, but are not limited to, computers, servers, PDAs, cellular phones, or any suitable computing devices. The I/O devices 1108 enable a user to interface with the program modules 1116. In one embodiment, the I/O devices 1108 are operatively connected to an I/O controller (not shown) that enables communication with the processing unit 1102 via the system bus 1112. The I/O devices 1108 may include one or more input devices, such as, but not limited to, a keyboard, a mouse, or an electronic stylus. Further, the I/O devices 1108 may include one or more output devices, such as, but not limited to, a display screen or a printer. In some embodiments, the I/O devices 1108 can be used for manual controls for operations to exercise under certain emergency situations.

The network devices 1110 enable the computer system 1100 to communicate with other networks or remote systems via a network 1118, such as the communications network(s) 114 and/or the cloud network 110. Examples of the network devices 1110 include, but are not limited to, a modem, a radio frequency ("RF") or infrared ("IR") transceiver, a telephonic interface, a bridge, a router, or a network card. The network 1118 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 1118 may be or may include a wired network such as, but not limited to, a Wide Area Network ("WAN"), a wired Personal Area Network ("PAN"), or a wired Metropolitan Area Network ("MAN").

Figure 12:
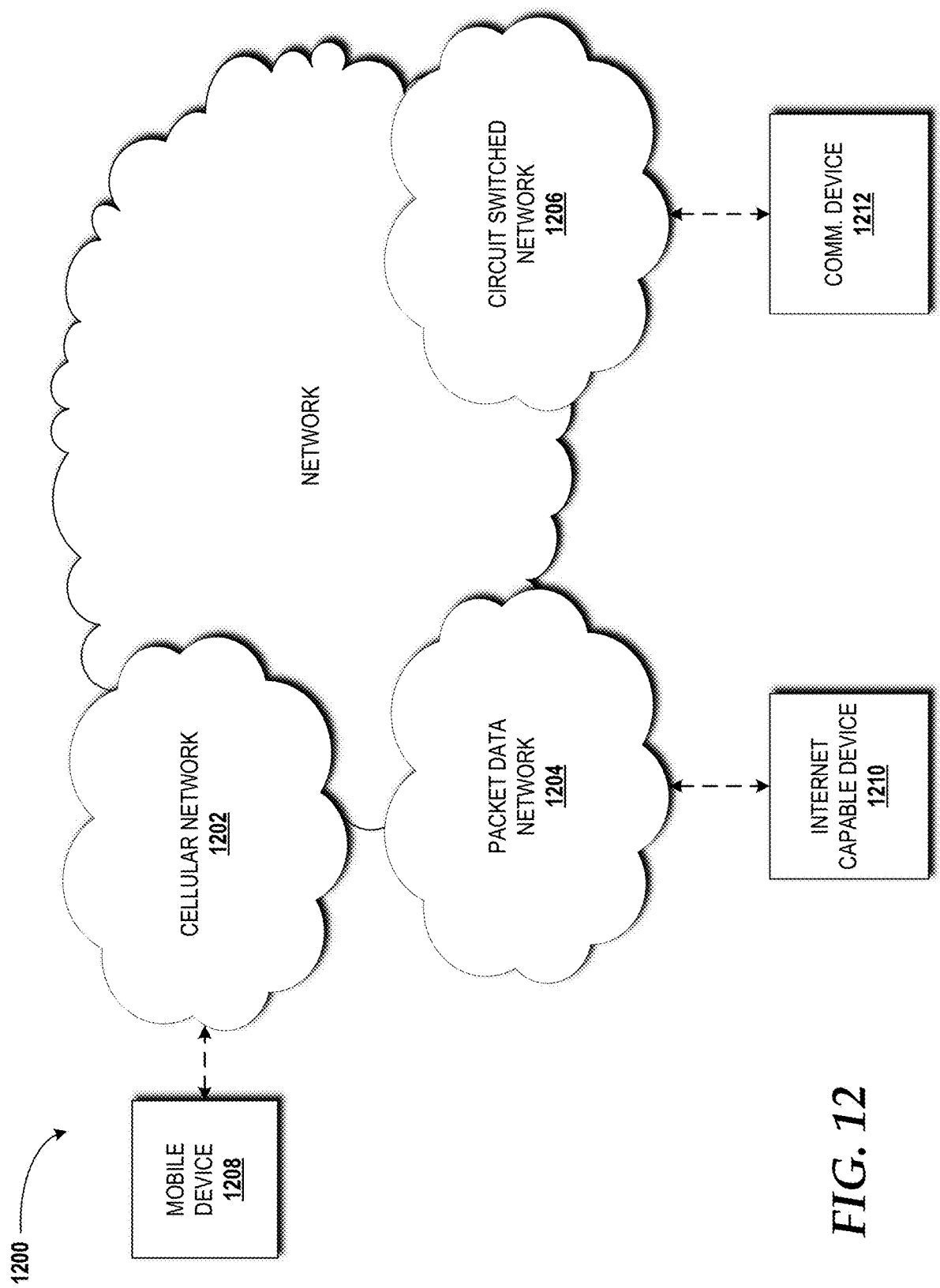
FIG. 12 is a block diagram of an example network, according to an illustrative embodiment.

Turning now to FIG. 12, an example network 1200 will be described, according to an illustrative embodiment. In the illustrated embodiment, the network 1200 includes a cellular network 1202, a packet data network 1204, for example, the Internet, and a circuit switched network 1206, for example, a publicly switched telephone network ("PSTN"). The cellular network 1202 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1202 also includes radios and nodes for receiving and transmitting voice, data, and combinations thereof to and from radio transceivers, networks, the packet data network 1204, and the circuit switched network 1206.

A mobile communications device 1208, such as, for example, a cellular telephone, a user equipment, a mobile terminal, a PDA, a laptop computer, a handheld computer, and combinations thereof, can be operatively connected to the cellular network 1202. The cellular network 1202 can be configured to utilize any using any wireless communications technology or combination of wireless communications technologies, some examples of which include, but are not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other Institute of Electrical and Electronics Engineers ("IEEE") 802.XX technologies, and the like. The mobile communications device 1208 can communicate with the cellular network 1202 via various channel access methods (which may or may not be used by the aforementioned technologies), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like. Data can be exchanged between the mobile communications device 1208 and the cellular network 1202 via cellular data technologies such as, but not limited to, General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. It should be understood that the cellular network 1202 may additionally include backbone infrastructure that operates on wired communications technologies, including, but not limited to, optical fiber, coaxial cable, twisted pair cable, and the like to transfer data between various systems operating on or in communication with the cellular network 1202.

The packet data network 1204 can include various devices, servers, computers, databases, and other devices in communication with one another. The packet data network 1204 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1204 includes or is in communication with the Internet.

The circuit switched network 1206 includes various hardware and software for providing circuit switched communications. The circuit switched network 1206 may include, or may be, what is often referred to as a plain old telephone system ("POTS"). The functionality of a circuit switched network 1206 or other circuit-switched network are generally known and will not be described herein in detail.

The illustrated cellular network 1202 is shown in communication with the packet data network 1204 and a circuit switched network 1206, though it should be appreciated that this is not necessarily the case. One or more Internet-capable systems/devices 1210, a personal computer ("PC"), a laptop, a portable device, or another suitable device, can communicate with one or more cellular networks 1202, and devices connected thereto, through the packet data network 1204. It also should be appreciated that the Internet-capable device 1210 can communicate with the packet data network 1204 through the circuit switched network 1206, the cellular network 1202, and/or via other networks (not illustrated).

As illustrated, a communications device 1212, for example, a telephone, facsimile machine, modem, computer, or the like, can be in communication with the circuit switched network 1206, and therethrough to the packet data network 1204 and/or the cellular network 1202. It should be appreciated that the communications device 1212 can be an Internet-capable device, and can be substantially similar to the Internet-capable device 1210. It should be appreciated that substantially all of the functionality described with reference to the network 618 can be performed by the cellular network 1202, the packet data network 1204, and/or the circuit switched network 1206, alone or in combination with additional and/or alternative networks, network elements, and the like.

Figure 13:
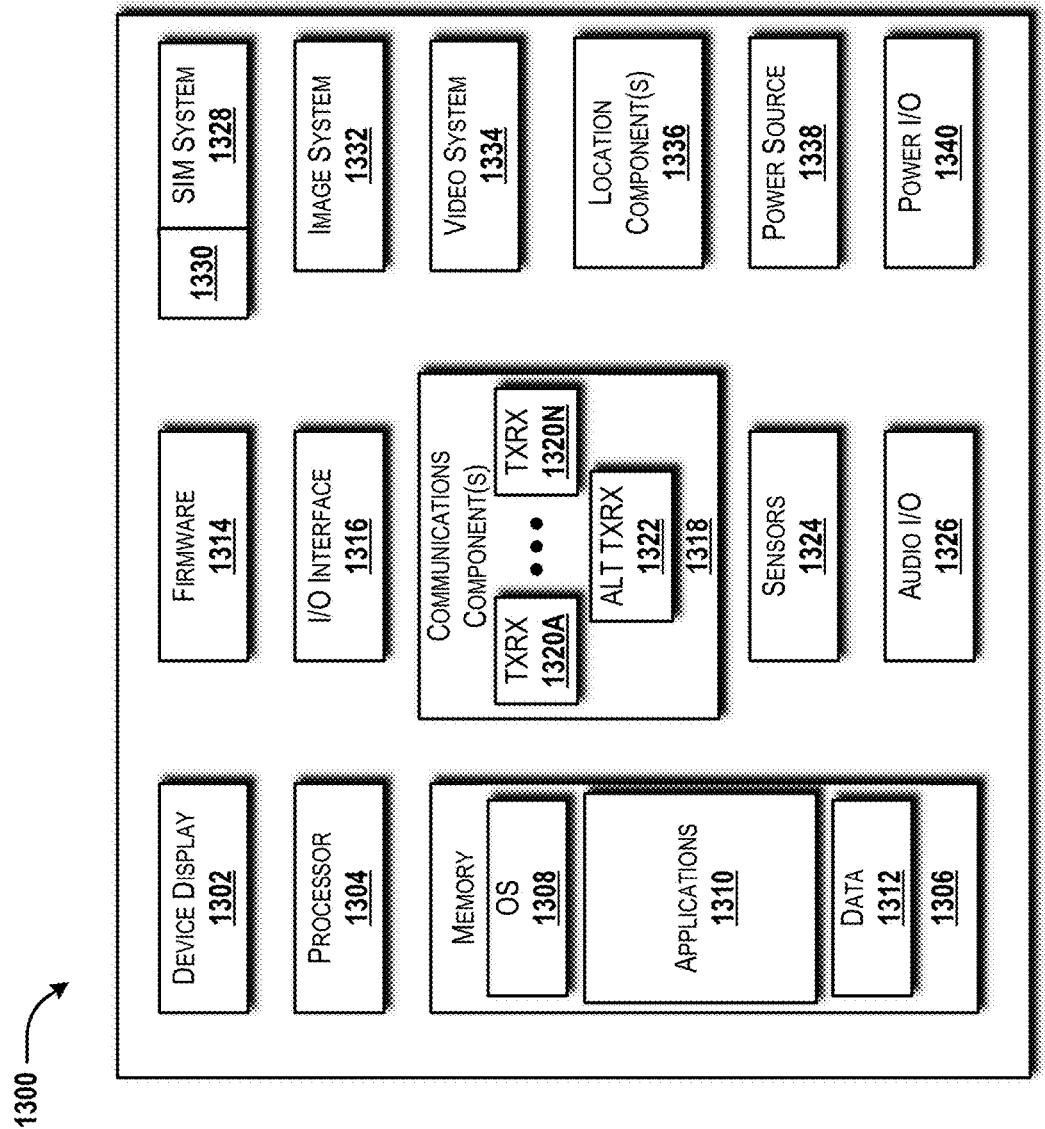
FIG. 13 is a block diagram of a mobile device and components thereof, according to an illustrative embodiment.

Turning now to FIG. 13, an illustrative mobile device 1300 and components thereof will be described. In some embodiments, one or more of the CPEs 112 described above with reference to FIG. 1 can be configured as and/or can have an architecture similar or identical to the mobile device 1300 described herein in FIG. 13. It should be understood, however, that the CPEs 112 may or may not include the functionality described herein with reference to FIG. 13. While connections are not shown between the various components illustrated in FIG. 13, it should be understood that some, none, or all of the components illustrated in FIG. 13 can be configured to interact with one another to carry out various device functions. In some embodiments, the components are arranged so as to communicate via one or more busses (not shown). Thus, it should be understood that FIG. 13 and the following description are intended to provide a general understanding of a suitable environment in which various aspects of embodiments can be implemented, and should not be construed as being limiting in any way.

As illustrated in FIG. 13, the mobile device 1300 can include a display 1302 for displaying data. According to various embodiments, the display 1302 can be configured to display network connection information, various GUI elements, text, images, video, virtual keypads and/or keyboards, messaging data, notification messages, metadata, Internet content, device status, time, date, calendar data, device preferences, map and location data, combinations thereof, and/or the like. The mobile device 1300 also can include a processor 1304 and a memory or other data storage device ("memory") 1306. The processor 1304 can be configured to process data and/or can execute computer-executable instructions stored in the memory 1306. The computer-executable instructions executed by the processor 1304 can include, for example, an operating system 1308, one or more applications 1310, other computer-executable instructions stored in the memory 1306, or the like. In some embodiments, the applications 1310 also can include a UI application (not illustrated in FIG. 13).

The UI application can interface with the operating system 1308 to facilitate user interaction with functionality and/or data stored at the mobile device 1300 and/or stored elsewhere. In some embodiments, the operating system 1308 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 1304 to aid a user in data communications, entering/deleting data, entering and setting user IDs and passwords for device access, configuring settings, manipulating content and/or settings, multimode interaction, interacting with other applications 1310, and otherwise facilitating user interaction with the operating system 1308, the applications 1310, and/or other types or instances of data 1312 that can be stored at the mobile device 1300.

The applications 1310, the data 1312, and/or portions thereof can be stored in the memory 1306 and/or in a firmware 1314, and can be executed by the processor 1304. The firmware 1314 also can store code for execution during device power up and power down operations. It can be appreciated that the firmware 1314 can be stored in a volatile or non-volatile data storage device including, but not limited to, the memory 1306 and/or a portion thereof.

The mobile device 1300 also can include an input/output ("I/O") interface 1316. The I/O interface 1316 can be configured to support the input/output of data such as location information, presence status information, user IDs, passwords, and application initiation (start-up) requests. In some embodiments, the I/O interface 1316 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 1300 can be configured to synchronize with another device to transfer content to and/or from the mobile device 1300. In some embodiments, the mobile device 1300 can be configured to receive updates to one or more of the applications 1310 via the I/O interface 1316, though this is not necessarily the case. In some embodiments, the I/O interface 1316 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1316 may be used for communications between the mobile device 1300 and a network device or local device.

The mobile device 1300 also can include a communications component 1318. The communications component 1318 can be configured to interface with the processor 1304 to facilitate wired and/or wireless communications with one or more networks. In some embodiments, the communications component 1318 includes a multimode communications subsystem for facilitating communications via the cellular network and one or more other networks.

The communications component 1318, in some embodiments, includes one or more transceivers. The one or more transceivers, if included, can be configured to communicate over the same and/or different wireless technology standards with respect to one another. For example, in some embodiments, one or more of the transceivers of the communications component 1318 may be configured to communicate using GSM, CDMAONE, CDMA2000, LTE, and various other 2G, 3G, 3G, 4G, 5G, 6G, and greater generation technology standards. Moreover, the communications component 1318 may facilitate communications over various channel access methods (which may or may not be used by the aforementioned standards) including, but not limited to, TDMA, FDMA, W-CDMA, OFDM, SDMA, and the like.

In addition, the communications component 1318 may facilitate data communications using GPRS, EDGE, the HSPA protocol family including HSDPA, EUL or otherwise termed HSDPA, HSPA+, and various other current and future wireless data access standards. In the illustrated embodiment, the communications component 1318 can include a first transceiver ("TxRx") 1320A that can operate in a first communications mode (e.g., GSM). The communications component 1318 also can include an Nth transceiver ("TxRx") 1320N that can operate in a second communications mode relative to the first transceiver 1320A (e.g., UMTS). While two transceivers 1320A-1320N (hereinafter collectively and/or generically referred to as "transceivers 1320") are shown in FIG. 13, it should be appreciated that less than two, two, and/or more than two transceivers 1320 can be included in the communications component 1318.

The communications component 1318 also can include an alternative transceiver ("Alt TxRx") 1322 for supporting other types and/or standards of communications. According to various contemplated embodiments, the alternative transceiver 1322 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 1318 also can facilitate reception from terrestrial radio networks, digital satellite radio networks, internet-based radio service networks, combinations thereof, and the like. The communications component 1318 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 1300 also can include one or more sensors 1324. The sensors 1324 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 1300 may be provided by an audio I/O component 1326. The audio I/O component 1326 of the mobile device 1300 can include one or more speakers for the output of audio signals, one or more microphones for the collection and/or input of audio signals, and/or other audio input and/or output devices.

The illustrated mobile device 1300 also can include a subscriber identity module ("SIM") system 1328. The SIM system 1328 can include a universal SIM ("USIM"), a universal integrated circuit card ("UICC") and/or other identity devices. The SIM system 1328 can include and/or can be connected to or inserted into an interface such as a slot interface 1330. In some embodiments, the slot interface 1330 can be configured to accept insertion of other identity cards or modules for accessing various types of networks. Additionally, or alternatively, the slot interface 1330 can be configured to accept multiple subscriber identity cards. Because other devices and/or modules for identifying users and/or the mobile device 1300 are contemplated, it should be understood that these embodiments are illustrative, and should not be construed as being limiting in any way.

The mobile device 1300 also can include an image capture and processing system 1332 ("image system"). The image system 1332 can be configured to capture or otherwise obtain photos, videos, and/or other visual information. As such, the image system 1332 can include cameras, lenses, charge-coupled devices ("CCDs"), combinations thereof, or the like. The mobile device 1300 may also include a video system 1334. The video system 1334 can be configured to capture, process, record, modify, and/or store video content. Photos and videos obtained using the image system 1332 and the video system 1334, respectively, may be added as message content to an MMS message, email message, and sent to another device. The video and/or photo content also can be shared with other devices via various types of data transfers via wired and/or wireless communication devices as described herein.

The mobile device 1300 also can include one or more location components 1336. The location components 1336 can be configured to send and/or receive signals to determine a geographic location of the mobile device 1300. According to various embodiments, the location components 1336 can send and/or receive signals from global positioning system ("GPS") devices, assisted-GPS ("A-GPS") devices, WI-FI/WIMAX and/or cellular network triangulation data, combinations thereof, and the like. The location component 1336 also can be configured to communicate with the communications component 1318 to retrieve triangulation data for determining a location of the mobile device 1300. In some embodiments, the location component 1336 can interface with cellular network nodes, telephone lines, satellites, location transmitters and/or beacons, wireless network transmitters and receivers, combinations thereof, and the like. In some embodiments, the location component 1336 can include and/or can communicate with one or more of the sensors 1324 such as a compass, an accelerometer, and/or a gyroscope to determine the orientation of the mobile device 1300. Using the location component 1336, the mobile device 1300 can generate and/or receive data to identify its geographic location, or to transmit data used by other devices to determine the location of the mobile device 1300. The location component 1336 may include multiple components for determining the location and/or orientation of the mobile device 1300.

The illustrated mobile device 1300 also can include a power source 1338. The power source 1338 can include one or more batteries, power supplies, power cells, and/or other power subsystems including alternating current ("AC") and/or direct current ("DC") power devices. The power source 1338 also can interface with an external power system or charging equipment via a power I/O component 1330. Because the mobile device 1300 can include additional and/or alternative components, the above embodiment should be understood as being illustrative of one possible operating environment for various embodiments of the concepts and technologies described herein. The described embodiment of the mobile device 1300 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 1300 or other devices or computers described herein, such as the computer system 1100 described above with reference to FIG. 11. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 1300 in order to store and execute the software components presented herein. It is also contemplated that the mobile device 1300 may not include all of the components shown in FIG. 13, may include other components that are not explicitly shown in FIG. 13, or may utilize an architecture completely different than that shown in FIG. 13.

Figure 14:
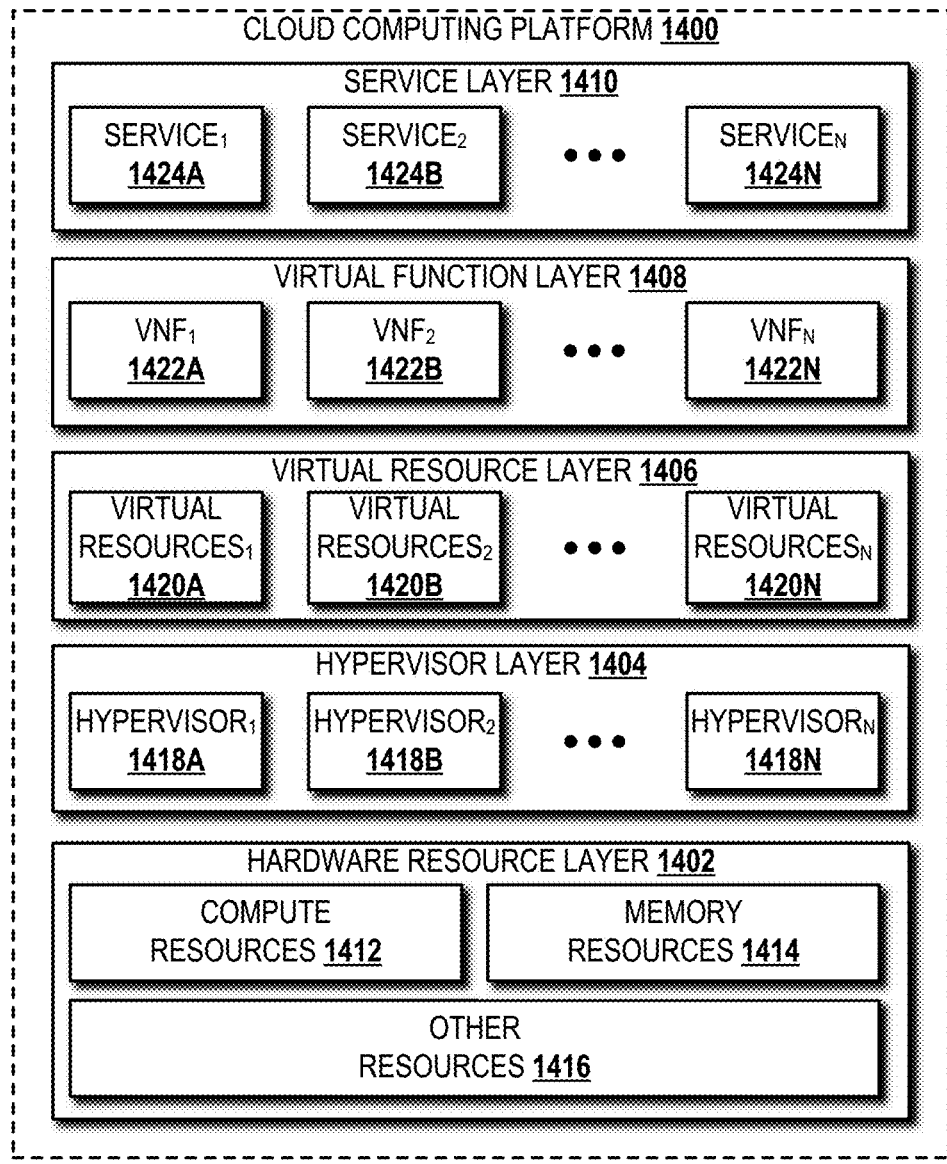
FIG. 14 is a block diagram illustrating a cloud computing platform capable of implementing aspects of the concepts and technologies disclosed herein.

Turning now to FIG. 14, an illustrative cloud computing platform 1400 capable of implementing aspects of the cloud network 110 will be described, according to an illustrative embodiment. The cloud computing platform 1400 includes a hardware resource layer 1402, a hypervisor layer 1404, a virtual resource layer 1406, a virtual function layer 1408, and a service layer 1410. While no connections are shown between the layers illustrated in FIG. 14, it should be understood that some, none, or all of the components illustrated in FIG. 14 can be configured to interact with one other to carry out various functions described herein. In some embodiments, the components are arranged so as to communicate via one or more networks. Thus, it should be understood that FIG. 14 and the remaining description are intended to provide a general understanding of a suitable environment in which various aspects of the embodiments described herein can be implemented and should not be construed as being limiting in any way.

The hardware resource layer 1402 provides hardware resources. In the illustrated embodiment, the hardware resource layer 1402 includes one or more compute resources 1412, one or more memory resources 1414, and one or more other resources 1416. The compute resource(s) 1412 can include one or more hardware components that perform computations to process data and/or to execute computer-executable instructions of one or more application programs, one or more operating systems, and/or other software. In particular, the compute resources 1412 can include one or more central processing units ("CPUs") configured with one or more processing cores. The compute resources 1412 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the compute resources 1412 can include one or more discrete GPUs. In some other embodiments, the compute resources 1412 can include CPU and GPU components that are configured in accordance with a co-processing CPU/GPU computing model, wherein the sequential part of an application executes on the CPU and the computationally-intensive part is accelerated by the GPU processing capabilities. The compute resources 1412 can include one or more system-on-chip ("SoC") components along with one or more other components, including, for example, one or more of the memory resources 1414, and/or one or more of the other resources 1416. In some embodiments, the compute resources 1412 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 1412 can be or can include one or more hardware components architected in accordance with an ARM architecture, available for license from ARM HOLDINGS of Cambridge, United Kingdom. Alternatively, the compute resources 1412 can be or can include one or more hardware components architected in accordance with an x86 architecture, such an architecture available from INTEL CORPORATION of Mountain View, Calif., and others. Those skilled in the art will appreciate the implementation of the compute resources 1412 can utilize various computation architectures, and as such, the compute resources 1412 should not be construed as being limited to any particular computation architecture or combination of computation architectures, including those explicitly disclosed herein.

The memory resource(s) 1414 can include one or more hardware components that perform storage/memory operations, including temporary or permanent storage operations. In some embodiments, the memory resource(s) 1414 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 1412.

The other resource(s) 1416 can include any other hardware resources that can be utilized by the compute resources(s) 1412 and/or the memory resource(s) 1414 to perform operations described herein. The other resource(s) 1416 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 1402 can be virtualized by one or more hypervisors 1418A-1418N (also known as "virtual machine monitors") operating within the hypervisor layer 1404 to create virtual resources that reside in the virtual resource layer 1406. The hypervisors 1418A-1418N can be or can include software, firmware, and/or hardware that alone or in combination with other software, firmware, and/or hardware, creates and manages virtual resources 1420A-1420N operating within the virtual resource layer 1406.

The virtual resources 1420A-1420N operating within the virtual resource layer 1406 can include abstractions of at least a portion of the compute resources 1412, the memory resources 1414, and/or the other resources 1416, or any combination thereof. In some embodiments, the abstractions can include one or more VMs, virtual volumes, virtual networks, and/or other virtualized resources upon which one or more VNFs 1422A-1422N can be executed. The VNFs 1422A-1422N in the virtual function layer 1408 are constructed out of the virtual resources 1420A-1420N in the virtual resource layer 1406. In the illustrated example, the VNFs 1422A-1422N can provide, at least in part, one or more services 1424A-1424N in the service layer 1410.

Figure 15:
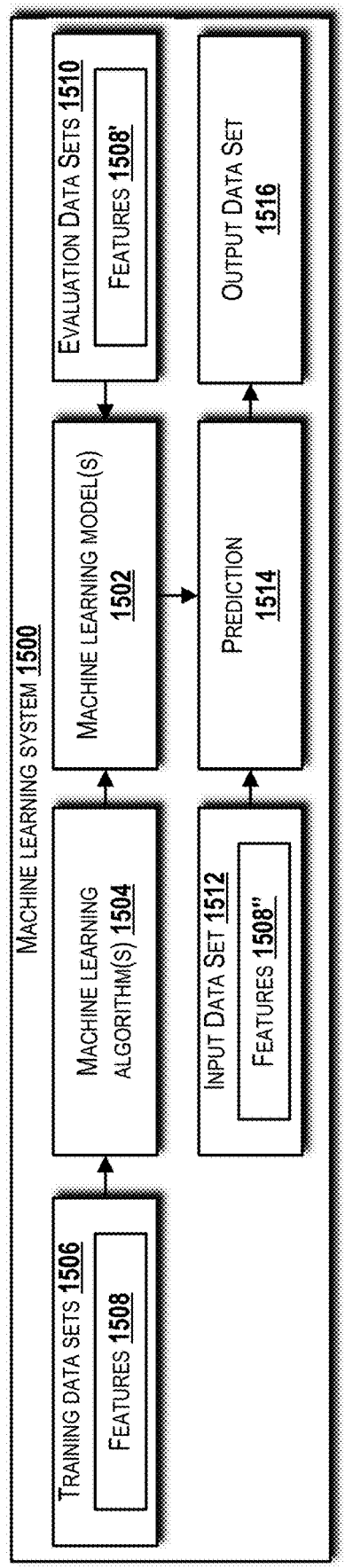
FIG. 15 is a diagram illustrating a machine learning system capable of implementing aspects of the embodiments disclosed herein, according to an illustrative embodiment.

Turning now to FIG. 15, a machine learning system 1500 capable of implementing aspects of the embodiments disclosed herein will be described. The machine learning system 1500 can be used to train the analytical model 124. Accordingly, the cloud gateway outage risk detector 102 can include the machine learning system 1500 or can be in communication with the machine learning system 1500.

The illustrated machine learning system 1500 includes one or more machine learning models 1502, such the machine learning models 146. The machine learning models 1502 can include unsupervised, supervised, and/or semi-supervised learning models. The machine learning model(s) 1502 can be created by the machine learning system 1500 based upon one or more machine learning algorithms 1504. The machine learning algorithm(s) 1504 can be any existing, well-known algorithm, any proprietary algorithms, or any future machine learning algorithm. Some example machine learning algorithms 1504 include, but are not limited to, neural networks, gradient descent, linear regression, logistic regression, linear discriminant analysis, decision trees, Naive Bayes, K-nearest neighbor, learning vector quantization, support vector machines, principal component analysis, and the like. Neural networks and random forest classification and regression algorithms might find particular applicability to the concepts and technologies disclosed herein. Those skilled in the art will appreciate the applicability of various machine learning algorithms 1504 based upon the problem(s) to be solved by machine learning via the machine learning system 1500.

The machine learning system 1500 can control the creation of the machine learning models 1502 via one or more training parameters (also referred to as "tuning parameters"). In some embodiments, the training parameters are selected variables or factors at the direction of an enterprise, for example. Alternatively, in some embodiments, the training parameters are automatically selected based upon data provided in one or more training data sets 1506. The training parameters can include, for example, a learning rate where relevant such as when a classification algorithm is utilized, a model size, a number of training passes, data shuffling, regularization, and/or other training parameters known to those skilled in the art.

The learning rate is a training parameter defined by a constant value. The learning rate affects the speed at which the machine learning algorithm 1504 converges to the optimal weights. The machine learning algorithm 1504 can update the weights for every data example included in the training data sets 1506. The size of an update is controlled by the learning rate. A learning rate that is too high might prevent the machine learning algorithm 1504 from converging to the optimal weights. A learning rate that is too low might result in the machine learning algorithm 1504 requiring multiple training passes to converge to the optimal weights.

The model size is regulated by the number of input features ("features") 1508 in the training data sets 1506. The training data sets 1506 and evaluation data sets 1510 discussed further below may be selected based on an appropriate training/test split for training and evaluation, such as an 80/20 split.

The number of training passes indicates the number of training passes that the machine learning algorithm 1504 makes over the training data sets 1506 during the training process. The number of training passes can be adjusted based, for example, on the size of the training data sets 1506, with larger training data sets being exposed to fewer training passes in consideration of time and/or resource utilization. The performance of the resultant machine learning model 1502 can be increased by multiple training passes.

Data shuffling is a training parameter designed to prevent the machine learning algorithm 1504 from reaching false optimal weights due to the order in which data contained in the training data sets 1506 is processed. For example, data provided in rows and columns might be analyzed first row, second row, third row, etc., and thus an optimal weight might be obtained well before a full range of data has been considered. By data shuffling, the data contained in the training data sets 1506 can be analyzed more thoroughly and mitigate bias in the resultant machine learning model 1502.

Regularization is a training parameter that helps to prevent the machine learning model 1502 from memorizing training data from the training data sets 1506. In other words, the machine learning model 1502 fits the training data sets 1506, but the predictive performance of the machine learning model 1502 is not acceptable. Regularization helps the machine learning system 1500 avoid this overfitting/memorization problem by adjusting extreme weight values of the features 1508. For example, a feature that has a small weight value relative to the weight values of the other features in the training data sets 1506 can be adjusted to zero.

The machine learning system 1500 can determine model accuracy, recall, precision, receiver operating characteristic ("ROC") area under the curve ("AUC"), and/or other desired metrics after training by using the training data sets 1506 with some of the features 1508 and testing the machine learning model 1502 with unseen evaluation data sets 1510 containing the same features 1508' in the training data sets 1506. This also prevents the machine learning model 1502 from simply memorizing the data contained in the training data sets 1506, which can overfit the data. The optimal or desired machine learning system 1500 is reached when a target model accuracy or other desired metric threshold is met, which is understood through a model evaluation process in examining model performance on the evaluation data set 1510. Once a machine learning model 1502 has reached the desired metric threshold or optimal performance, the machine learning model 1502 is considered ready for deployment.

After deployment, the machine learning model 1502 can perform a prediction operation ("prediction") 1514 with an input data set 1512 having the same features 1508" as the features 1508 in the training data sets 1506 and the features 1508' of the evaluation data sets 1510. The results of the prediction 1514 are included in an output data set 1516 consisting of predicted data. The machine learning model 1502 can perform other operations, such as regression, classification, and others. As such, the example illustrated in FIG. 15 should not be construed as being limiting in any way.

Based on the foregoing, it should be appreciated that aspects of a cloud gateway outage risk detector have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
   receiving, by a baseline risk criteria calculation module, a run-time risk criteria calculation module, and an outage risk threshold calculation module of an analytical model module, input comprising a model structure and a key model parameter for building an analytical model, wherein the baseline risk criteria calculation module, the run-time risk criteria calculation module, and the outage risk threshold calculation module are executed by a processor of a cloud gateway outage risk detector;
   determining, by the baseline risk criteria calculation module, based at least in part upon the model structure and the key model parameter, a baseline risk criteria calculation algorithm to be used to determine a baseline outage risk criteria;
   determining, by the run-time risk criteria calculation module, based at least in part upon the model structure and the key model parameter, a run-time risk criteria calculation algorithm to be used to determine a run-time outage risk criteria;
   determining, by the outage risk threshold calculation module, an outage risk threshold calculation algorithm to be used to determine an outage risk threshold;
   receiving, by an event listener module of a risk evaluator module executed by the processor of the cloud gateway outage risk detector, user session data associated with a plurality of user sessions over a cloud gateway;
   storing, by the event listener module, the user session data in a time series database;
   obtaining, by a run-time collection module of the risk evaluator module executed by the processor of the cloud gateway outage risk detector, at least a portion of the user session data from the time series database, wherein the portion of the user session data is in equal time intervals;
   providing, by the run-time collection module, the portion of the user session data to a run-time risk criteria evaluation module of the risk evaluator module;
   obtaining, by a baseline risk criteria evaluation module of the risk evaluator module executed by the processor of the cloud gateway outage risk detector, historical user session data from the time series database;
   determining, by the baseline risk criteria evaluation module, based upon the historical user session data, the baseline outage risk criteria for the cloud gateway;
   determining, by the run-time risk criteria evaluation module, based upon the portion of the user session data, the run-time outage risk criteria for the cloud gateway; and
   determining, by the run-time risk criteria evaluation module, whether the run-time outage risk criteria meets or exceeds the outage risk threshold.

2. The method of claim 1, further comprising, in response to determining that the run-time outage risk criteria meets or exceeds the outage risk threshold, instructing a notification module of the risk evaluator module executed by the processor of the cloud gateway outage risk detector to generate a high outage risk alert for the cloud gateway.

3. The method of claim 2, further comprising:
   generating, by the notification module of the risk evaluator module executed by the processor of the cloud gateway outage risk detector, the high outage risk alert; and
   sending the high outage risk alert to an external entity to inform the external entity that the cloud gateway is at high risk of experiencing an outage.

4. The method of claim 3, wherein the external entity comprises a network operations center.

5. The method of claim 1, further comprising:
   providing, by the baseline risk criteria calculation module, the baseline risk criteria calculation algorithm to the baseline risk criteria evaluation module of the risk evaluator module, wherein the baseline risk criteria evaluation module determines the baseline outage risk criteria;
   providing, by the run-time risk criteria calculation module, the run-time risk criteria calculation algorithm to the run-time risk criteria evaluation module of the risk evaluator module, wherein the run-time risk criteria evaluation module determines the run-time outage risk criteria; and
   providing, by the outage risk threshold calculation module, the outage risk threshold calculation algorithm to the run-time risk criteria evaluation module of the risk evaluator module, wherein the run-time risk criteria evaluation module determines the outage risk threshold.

6. A cloud gateway outage risk detector comprising:
   a processor; and
   a memory comprising instructions for a plurality of modules that, when executed by the processor, cause the processor to perform operations comprising
      receiving, by a baseline risk criteria calculation module, a run-time risk criteria calculation module, and an outage risk threshold calculation module of an analytical model module, input comprising a model structure and a key model parameter,
      determining, by the baseline risk criteria calculation module, based at least in part upon the model structure and the key model parameter, a baseline risk criteria calculation algorithm to be used to determine a baseline outage risk criteria,
      determining, by the run-time risk criteria calculation module, based at least in part upon the model structure and the key model parameter, a run-time risk criteria calculation algorithm to be used to determine a run-time outage risk criteria,
      determining, by the outage risk threshold calculation module, an outage risk threshold calculation algorithm to be used to determine an outage risk threshold,
      receiving, by an event listener module of a risk evaluator module, user session data associated with a plurality of user sessions over a cloud gateway,
      storing, by the event listener module, the user session data in a time series database, obtaining, by a run-time collection module of the risk evaluator module, at least a portion of the user session data from the time series database, wherein the portion of the user session data is in equal time intervals, providing, by the run-time collection module, the portion of the user session data to a run-time risk criteria evaluation module of the risk evaluator module, obtaining, by a baseline risk criteria evaluation module of the risk evaluator module, historical user session data from the time series database, determining, by the baseline risk criteria evaluation module, based upon the historical user session data, the baseline outage risk criteria for the cloud gateway, determining, by the run-time risk criteria evaluation module, based upon the portion of the user session data, the run-time outage risk criteria for the cloud gateway, and determining, by the run-time risk criteria evaluation module, whether the run-time outage risk criteria meets or exceeds the outage risk threshold.

7. The cloud gateway outage risk detector of claim 6, wherein the operations further comprise, in response to determining that the run-time outage risk criteria meets or exceeds the outage risk threshold, instructing a notification module of the risk evaluator module to generate a high outage risk alert for the cloud gateway.

8. The cloud gateway outage risk detector of claim 7, wherein the operations further comprise:
generating, by the notification module of the risk evaluator module, the high outage risk alert; and
sending, by the notification module, the high outage risk alert to an external entity to inform the external entity that the cloud gateway is at high risk of experiencing an outage.

9. The cloud gateway outage risk detector of claim 8, wherein the external entity comprises a network operations center.

10. The cloud gateway outage risk detector of claim 6, wherein the operations further comprise:
providing, by the baseline risk criteria calculation module, the baseline risk criteria calculation algorithm to the baseline risk criteria evaluation module of the risk evaluator module, wherein the baseline risk criteria evaluation module determines the baseline outage risk criteria;
providing, by the run-time risk criteria calculation module, the run-time risk criteria calculation algorithm to the run-time risk criteria evaluation module of the risk evaluator module, wherein the run-time risk criteria evaluation module determines the run-time outage risk criteria; and
providing, by the outage risk threshold calculation module, the outage risk threshold calculation algorithm to the run-time risk criteria evaluation module of the risk evaluator module, wherein the run-time risk criteria evaluation module determine the outage risk threshold.

11. A computer-readable storage medium comprising computer-executable instructions for a plurality of modules that, when executed by a processor, cause the processor to perform operations comprising:
receiving, by a baseline risk criteria calculation module, a run-time risk criteria calculation module, and an outage risk threshold calculation module of an analytical model module, input comprising a model structure and a key model parameter;

determining, by the baseline risk criteria calculation module, based at least in part upon the model structure and the key model parameter, a baseline risk criteria calculation algorithm to be used to determine a baseline outage risk criteria;

determining, by the run-time risk criteria calculation module, based at least in part upon the model structure and the key model parameter, a run-time risk criteria calculation algorithm to be used to determine a run-time outage risk criteria;

determining, by the outage risk threshold calculation module, an outage risk threshold calculation algorithm to be used to determine an outage risk threshold;

receiving, by an event listener module of a risk evaluator module, user session data associated with a plurality of user sessions over a cloud gateway;

storing, by the event listener module, the user session data in a time series database;

obtaining, by a run-time collection module of the risk evaluator module, at least a portion of the user session data from the time series database, wherein the portion of the user session data is in equal time intervals;

providing, by the run-time collection module, the portion of the user session data to a run-time risk criteria evaluation module of the risk evaluator module;

obtaining, by a baseline risk criteria evaluation module of the risk evaluator module, historical user session data from the time series database;

determining, by the baseline risk criteria evaluation module, based upon the historical user session data, the baseline outage risk criteria for the cloud gateway;

determining, by the run-time risk criteria evaluation module, based upon the portion of the user session data, the run-time outage risk criteria for the cloud gateway; and determining, by the run-time risk criteria evaluation module, whether the run-time outage risk criteria meets or exceeds the outage risk threshold.

12. The computer-readable storage medium of claim 11, wherein the operations further comprise, in response to determining that the run-time outage risk criteria meets or exceeds the outage risk threshold, instructing a notification module of the risk evaluator module to generate a high outage risk alert for the cloud gateway.

13. The computer-readable storage medium of claim 12, wherein the operations further comprise:
generating, by the notification module of the risk evaluator module, the high outage risk alert; and
sending, by the notification module, the high outage risk alert to an external entity to inform the external entity that the cloud gateway is at high risk of experiencing an outage.

14. The computer-readable storage medium of claim 11, wherein the operations further comprise:
providing, by the baseline risk criteria calculation module, the baseline risk criteria calculation algorithm to the baseline risk criteria evaluation module of the risk evaluator module, wherein the baseline risk criteria evaluation module determines the baseline outage risk criteria;
providing, by the run-time risk criteria calculation module, the run-time risk criteria calculation algorithm to the run-time risk criteria evaluation module of the risk evaluator module, wherein the run-time risk criteria evaluation module determines the run-time outage risk criteria; and
providing, by the outage risk threshold calculation module, the outage risk threshold calculation algorithm to the run-time risk criteria evaluation module of the risk evaluator module, wherein the run-time risk criteria evaluation module determine the outage risk threshold.

\* \* \* \* \*